US012035066B2

(12) United States Patent
Hiraishi et al.

(10) Patent No.: US 12,035,066 B2
(45) Date of Patent: Jul. 9, 2024

(54) IMAGE PROVIDING SYSTEM AND METHOD FOR CONTROLLING SAME

(71) Applicant: CANON KABUSHIKI KAISHA, Tokyo (JP)

(72) Inventors: Tomonobu Hiraishi, Tokyo (JP); Koshi Tokunaga, Chiba (JP); Tomoki Kuroda, Tokyo (JP); Junko Morikawa, Chiba (JP); Tokichi Minami, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 221 days.

(21) Appl. No.: 17/556,334

(22) Filed: Dec. 20, 2021

(65) Prior Publication Data

US 2022/0116551 A1  Apr. 14, 2022

Related U.S. Application Data

(63) Continuation of application No. PCT/JP2020/024176, filed on Jun. 19, 2020.

(30) Foreign Application Priority Data

Jun. 21, 2019 (JP) ................................ 2019-115713
Jun. 28, 2019 (JP) ................................ 2019-122039
(Continued)

(51) Int. Cl.
*H04N 5/262* (2006.01)
*G06T 7/11* (2017.01)
(Continued)

(52) U.S. Cl.
CPC ............. *H04N 5/2628* (2013.01); *G06T 7/11* (2017.01); *G06V 40/166* (2022.01);
(Continued)

(58) Field of Classification Search
CPC ...... H04N 5/2658; H04N 23/80; H04N 23/90; H04N 7/181; G06T 7/11; G06V 40/172; G06V 40/166
See application file for complete search history.

(56) References Cited

U.S. PATENT DOCUMENTS

2002/0085762 A1   7/2002  Shniberg et al.
2010/0110195 A1*  5/2010  Mcintosh ........... H04N 21/2543
                                                                348/157
(Continued)

FOREIGN PATENT DOCUMENTS

JP   2004-297363 A   10/2004
JP   2007-142896 A    6/2007
(Continued)

OTHER PUBLICATIONS

The above foreign patent document was cited in the May 30, 2023 Japanese Office Action, which is enclosed without an English Translation, that issued in Japanese Patent Application No. 2019-122039.
(Continued)

*Primary Examiner* — Mishawn N. Hunter
(74) *Attorney, Agent, or Firm* — Cowan, Liebowitz & Latman, P.C.

(57) ABSTRACT

An image providing system capable of quickly providing a plurality of different cropped images is disclosed. The image providing system acquires position information about a position of a user designated by the user. The image providing system determines a range of an image that was captured by an image capturing unit, the range corresponding to the position information as a cropping range, before the image capturing unit starts a series of image capturing in which the image capturing unit captures a plurality of images. After the series of image capturing is started, the system applies cropping that cuts out a part of a captured
(Continued)

image based on the cropping range. During the series of image capturing, the system provides a cropped image to which the cropping has been applied in a way in which a user can obtain the cropped image.

11 Claims, 29 Drawing Sheets

(30) Foreign Application Priority Data

Jun. 28, 2019 (JP) .................................. 2019-122252
Mar. 18, 2020 (JP) .................................. 2020-048159

(51) Int. Cl.
*G06V 40/16* (2022.01)
*H04N 7/18* (2006.01)
*H04N 23/80* (2023.01)
*H04N 23/90* (2023.01)

(52) U.S. Cl.
CPC ........... *G06V 40/172* (2022.01); *H04N 7/181* (2013.01); *H04N 23/80* (2023.01); *H04N 23/90* (2023.01); *G06T 2207/20132* (2013.01); *G06T 2207/30201* (2013.01)

(56) References Cited

U.S. PATENT DOCUMENTS

| 2015/0062334 A1* | 3/2015 | Dickinson | H04N 7/181 |
| | | | 348/143 |
| 2015/0347827 A1 | 12/2015 | Dickinson et al. | |
| 2016/0205358 A1* | 7/2016 | Dickinson | H04N 7/188 |
| | | | 348/157 |
| 2019/0043281 A1* | 2/2019 | Aman | G07C 9/215 |

FOREIGN PATENT DOCUMENTS

| JP | 2012-023501 A | 2/2012 |
| WO | 2016/088437 A1 | 6/2016 |

OTHER PUBLICATIONS

Nov. 28, 2023 Japanese Office Action, which is enclosed without an English Translation, that issued in Japanese Patent Application No. 2020-048159.

The above references were cited in the International Search Report dated Aug. 25, 2020 of International Application No. PCT/JP2020/024176, which is enclosed.

* cited by examiner

FIG. 6

| ROW NUMBER | SEAT NUMBER | CAMERA NUMBER | TOP-LEFT X-COORDINATE | TOP-LEFT Y-COORDINATE | TOP-RIGHT X-COORDINATE | TOP-RIGHT Y-COORDINATE |
|---|---|---|---|---|---|---|
| 1 | 1 | 1 | 50 | 350 | 250 | 50 |
| 1 | 2 | 1 | 200 | 350 | 400 | 50 |
| 1 | 3 | 1 | 350 | 350 | 550 | 50 |
| 1 | 4 | 1 | 500 | 350 | 700 | 50 |
| ... | ... | ... | ... | ... | ... | ... |

601  602  603  604  605  606  607

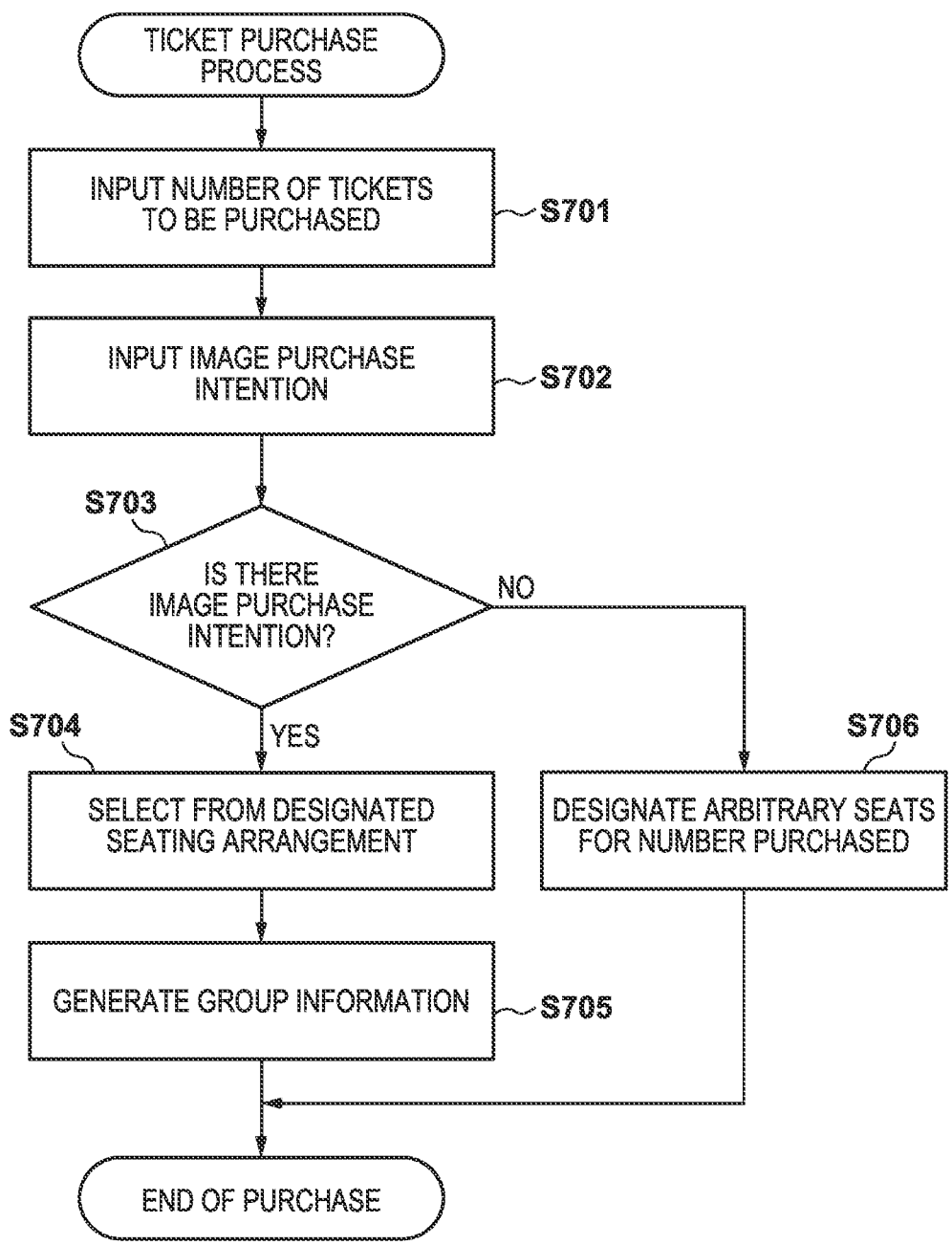

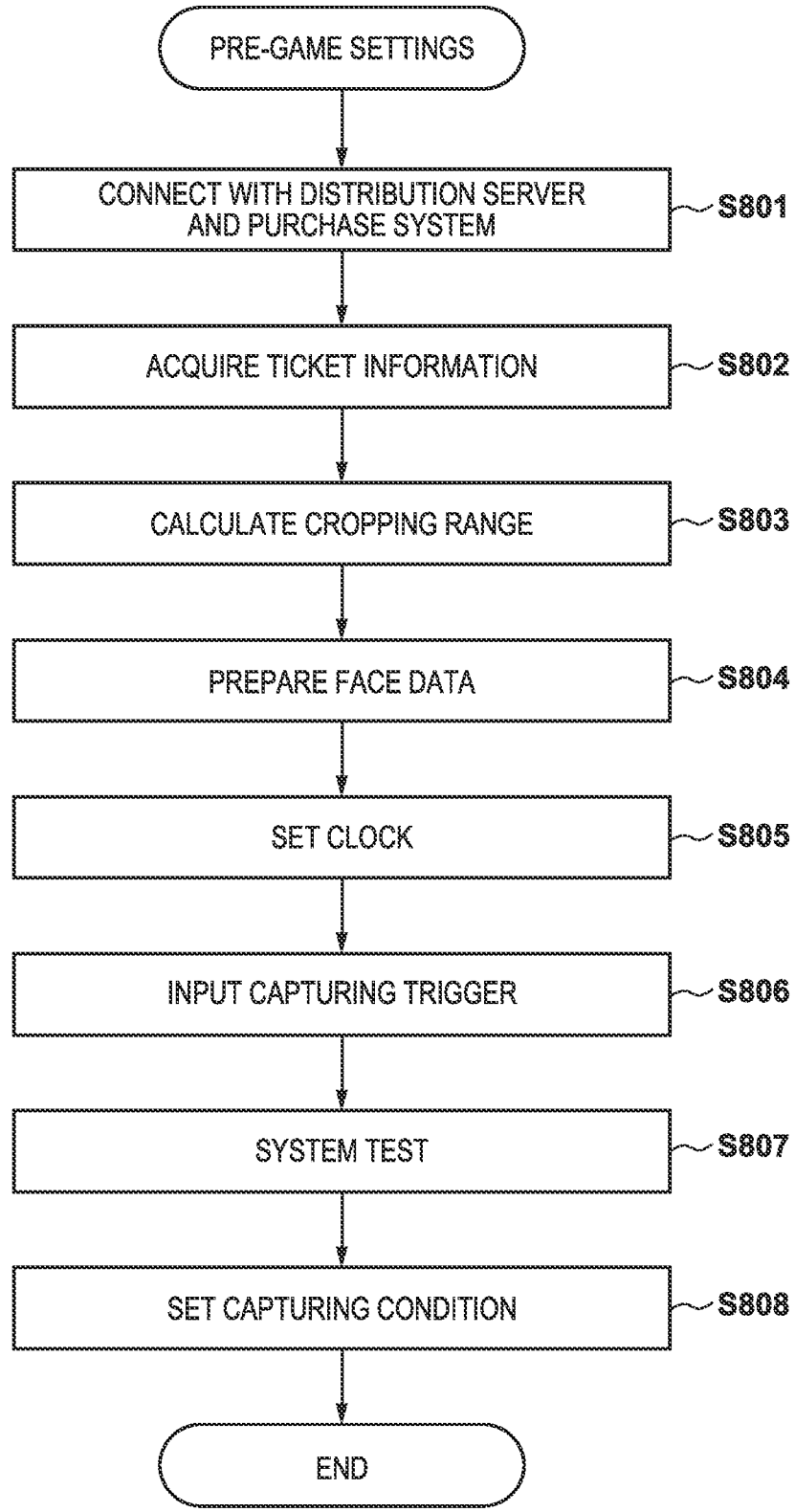

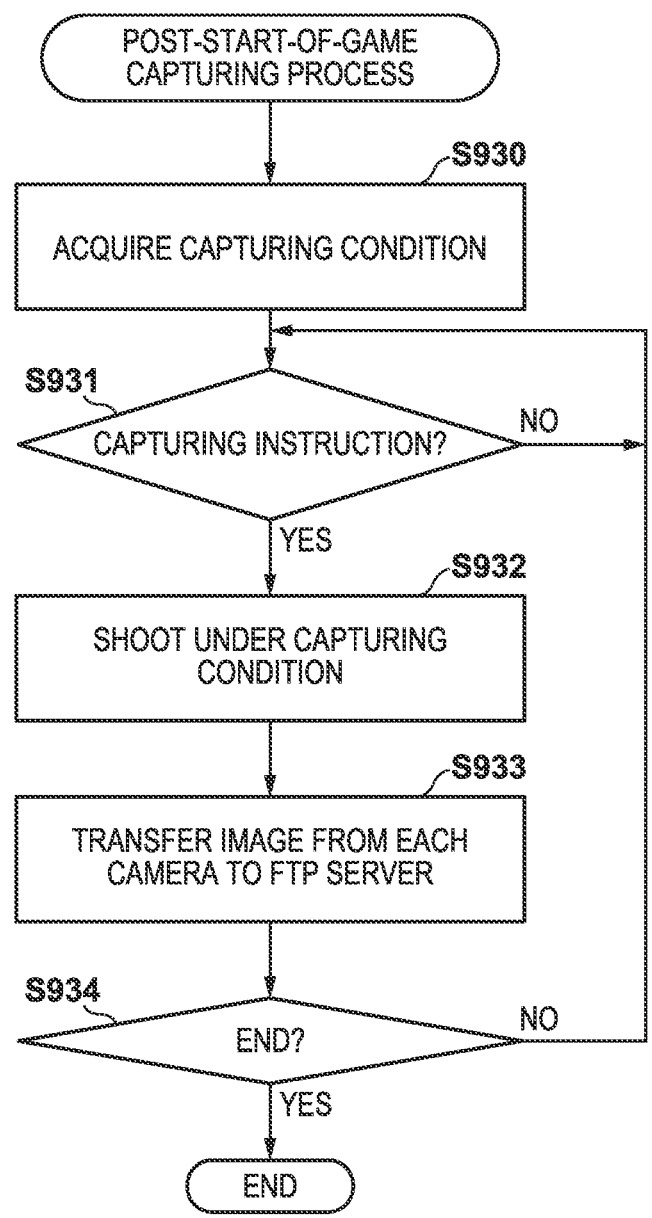

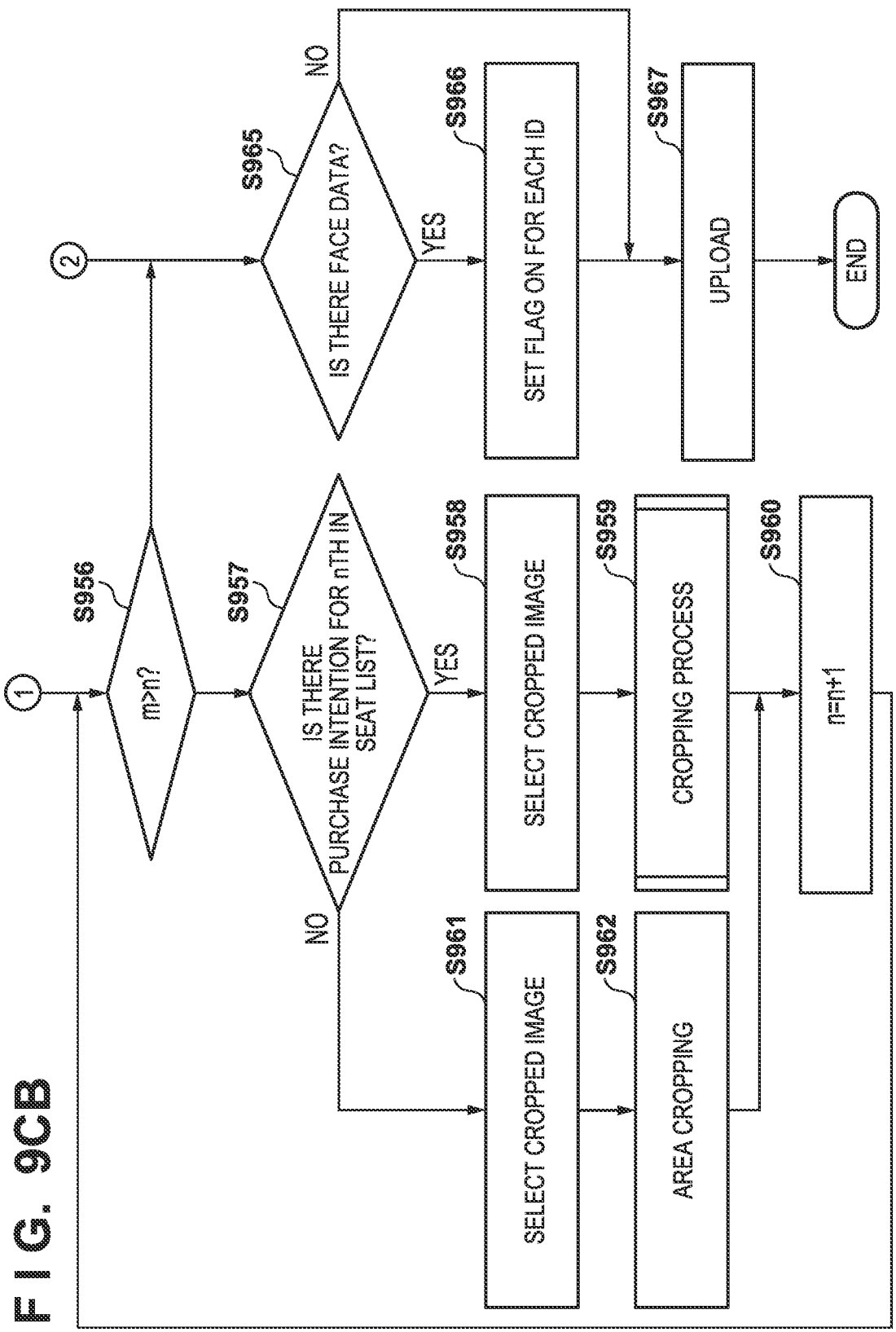

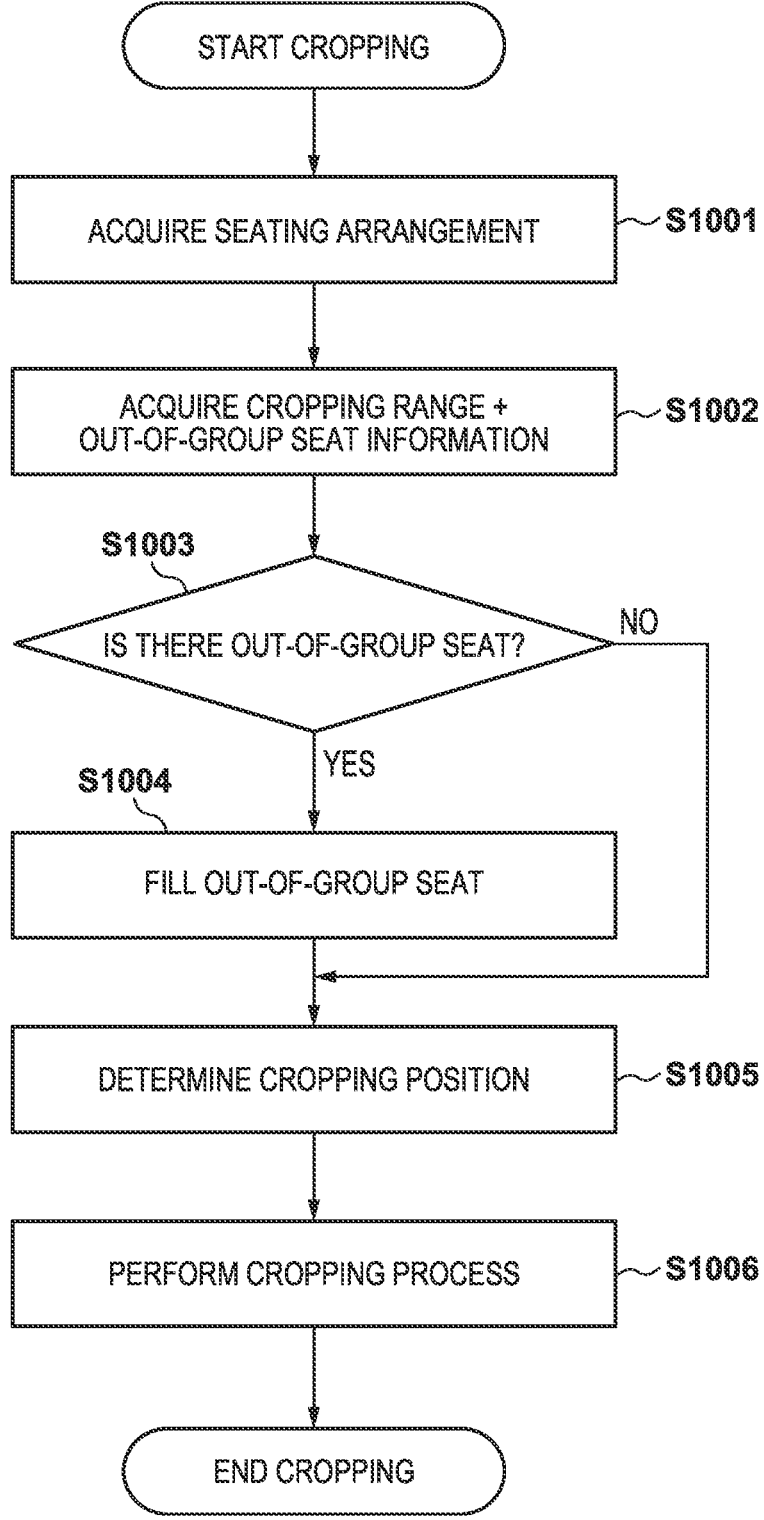

FIG. 11A
4 PEOPLE
PATTERN (1)    PATTERN (2) 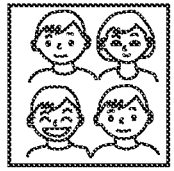
FIG. 11B
5 PEOPLE
PATTERN (1)    PATTERN (2) 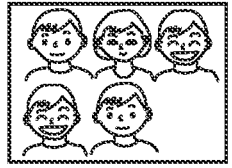   PATTERN (3) 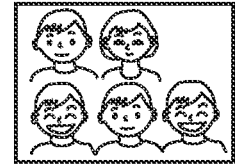
FIG. 11C
6 PEOPLE
PATTERN (1) 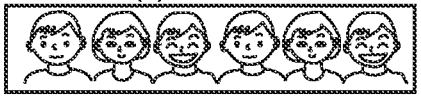   PATTERN (2) 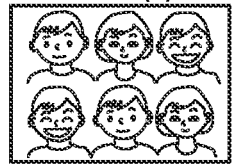   PATTERN (3) 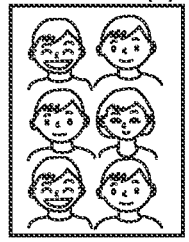

FIG. 13

| NUMBER OF PEOPLE | ARRANGEMENT PATTERN | TOP-LEFT X-COORDINATE | TOP-LEFT Y-COORDINATE | BOTTOM-RIGHT X-COORDINATE | BOTTOM-RIGHT Y-COORDINATE | OUT-OF-GROUP SEAT |
|---|---|---|---|---|---|---|
| 4 | 1 | X,Y_TOP-LEFT | X,Y_TOP-LEFT | (X+3),Y_BOTTOM-RIGHT | (X+3),Y_BOTTOM-RIGHT | |
| 4 | 2 | X,(Y+1)_TOP-LEFT | X,(Y+1)_TOP-LEFT | (X+1),Y_BOTTOM-RIGHT | (X+1),Y_BOTTOM-RIGHT | |
| 5 | 1 | X,Y_TOP-LEFT | X,Y_TOP-LEFT | (X+4),Y_BOTTOM-RIGHT | (X+4),Y_BOTTOM-RIGHT | |
| 5 | 2 | X,(Y+1)_TOP-LEFT | X,(Y+1)_TOP-LEFT | (X+2),Y_BOTTOM-RIGHT | (X+2),Y_BOTTOM-RIGHT | (X+2),Y |
| 5 | 3 | X,(Y+1)_TOP-LEFT | X,(Y+1)_TOP-LEFT | (X+2),Y_BOTTOM-RIGHT | (X+2),Y_BOTTOM-RIGHT | (X+2),(Y+1) |
| 6 | 1 | X,Y_TOP-LEFT | X,Y_TOP-LEFT | (X+5),Y_BOTTOM-RIGHT | (X+5),Y_BOTTOM-RIGHT | |
| 6 | 2 | X,(Y+1)_TOP-LEFT | X,(Y+1)_TOP-LEFT | (X+2),Y_BOTTOM-RIGHT | (X+2),Y_BOTTOM-RIGHT | |
| 6 | 3 | X,(Y+2)_TOP-LEFT | X,(Y+2)_TOP-LEFT | (X+1),Y_BOTTOM-RIGHT | (X+1),Y_BOTTOM-RIGHT | |
| ... | ... | ... | ... | | | |

FIG. 14

| NUMBER OF PEOPLE 1301 | ARRANGEMENT PATTERN 1302 | TOP-LEFT X-COORDINATE 1303 | TOP-LEFT Y-COORDINATE 1304 | BOTTOM-RIGHT X-COORDINATE 1305 | BOTTOM-RIGHT Y-COORDINATE 1306 | OUT-OF-GROUP SEAT 1307 |
|---|---|---|---|---|---|---|
| 4 | 1 | X,Y_TOP-LEFT | X,Y_TOP-LEFT | (X+3),Y_BOTTOM-RIGHT | (X+3),Y_BOTTOM-RIGHT | |
| 4 | 2 | X,Y_TOP-LEFT | X,(Y+1)_TOP-LEFT | (X+1),(Y+1)_BOTTOM-RIGHT | (X+1),Y_BOTTOM-RIGHT | |
| 5 | 1 | X,Y_TOP-LEFT | X,Y_TOP-LEFT | (X+4),Y_BOTTOM-RIGHT | (X+4),Y_BOTTOM-RIGHT | |
| 5 | 2 | X,Y_TOP-LEFT | X,(Y+1)_TOP-LEFT | (X+2),(Y+1)_BOTTOM-RIGHT | (X+2),Y_BOTTOM-RIGHT | (X+2),Y |
| 5 | 3 | X,Y_TOP-LEFT | X,(Y+1)_TOP-LEFT | (X+2),(Y+1)_BOTTOM-RIGHT | (X+2),Y_BOTTOM-RIGHT | (X+2),(Y+1) |
| 6 | 1 | X,Y_TOP-LEFT | X,Y_TOP-LEFT | (X+5),Y_BOTTOM-RIGHT | (X+5),Y_BOTTOM-RIGHT | |
| 6 | 2 | X,Y_TOP-LEFT | X,(Y+1)_TOP-LEFT | (X+2),(Y+1)_BOTTOM-RIGHT | (X+2),Y_BOTTOM-RIGHT | |
| 6 | 3 | X,Y_TOP-LEFT | X,(Y+2)_TOP-LEFT | (X+1),(Y+2)_BOTTOM-RIGHT | (X+1),Y_BOTTOM-RIGHT | |
| ... | ... | ... | ... | ... | ... | |

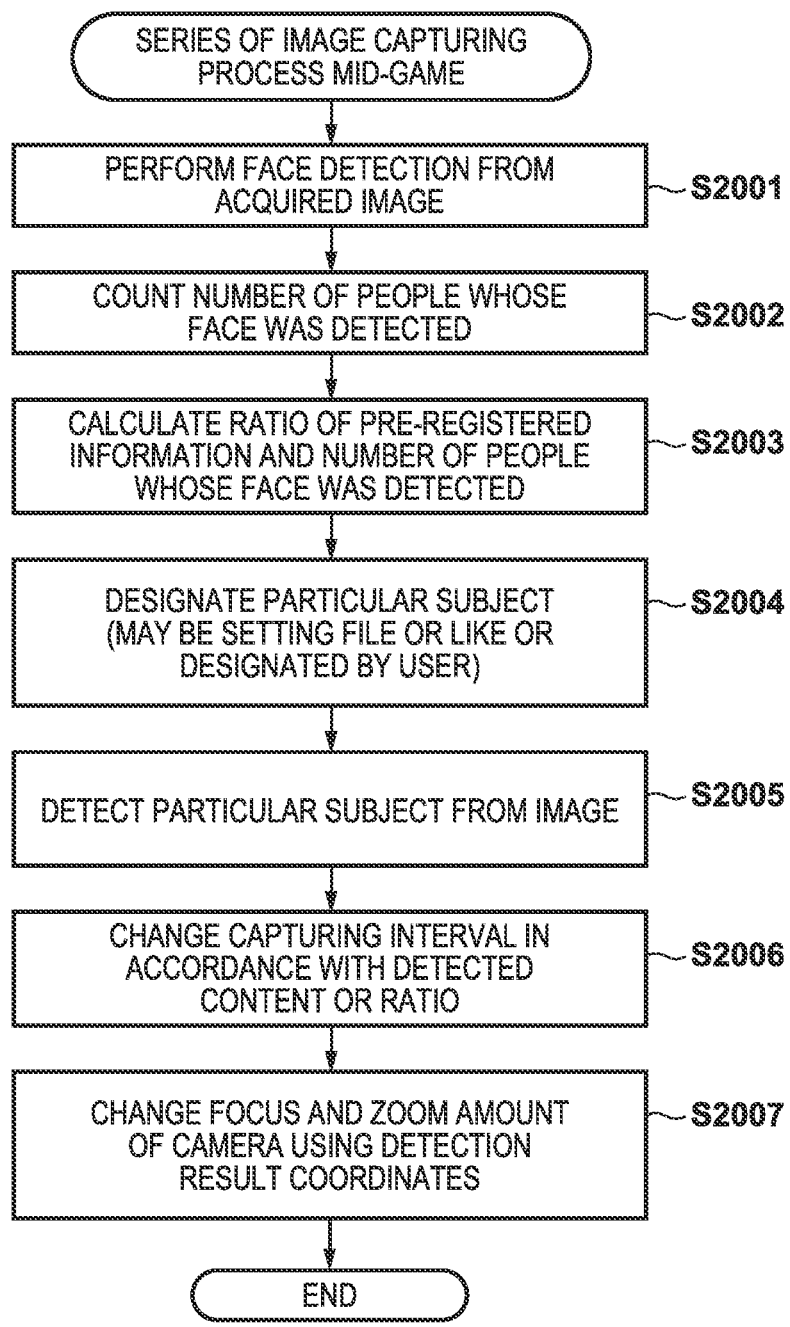

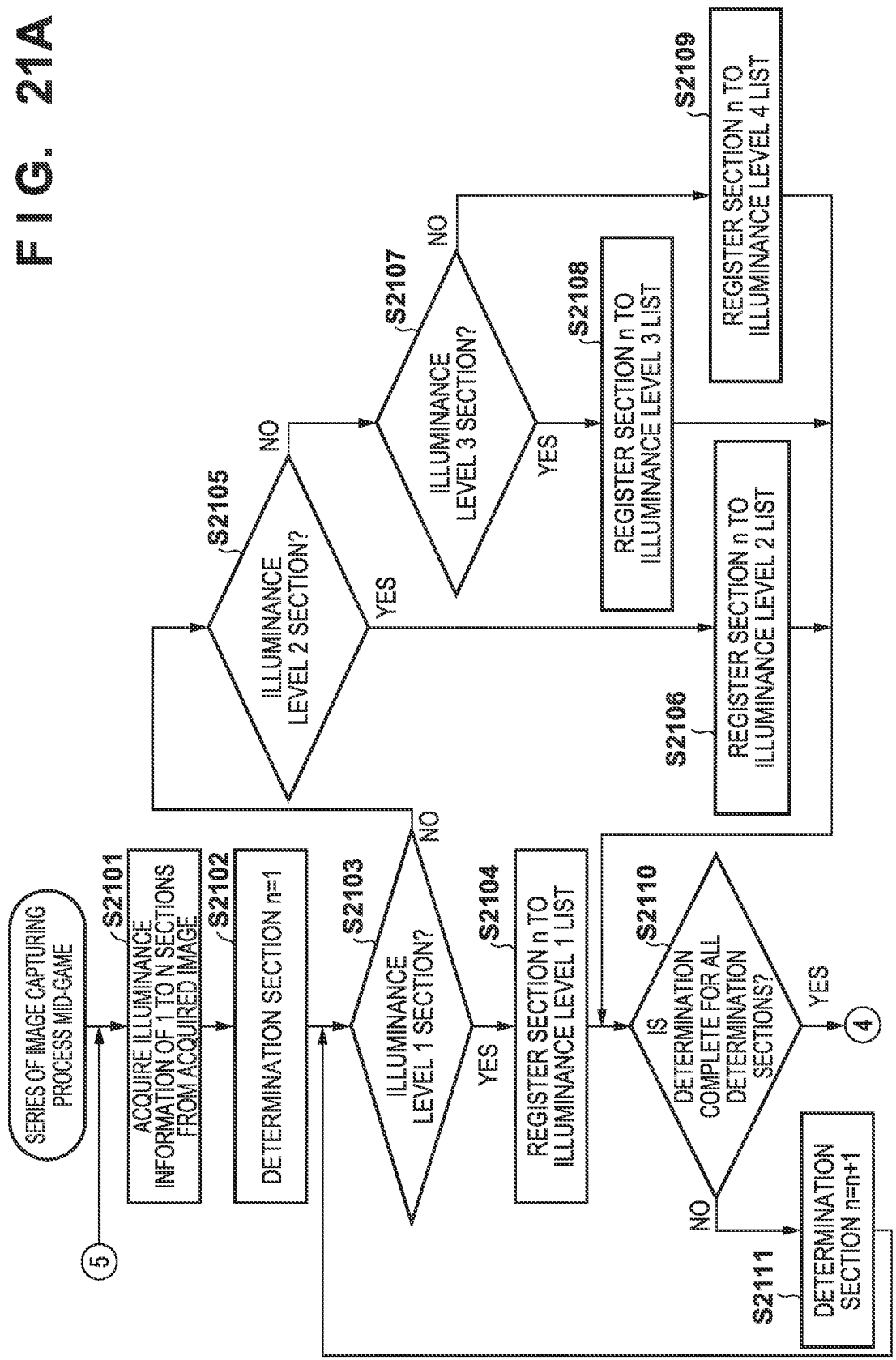

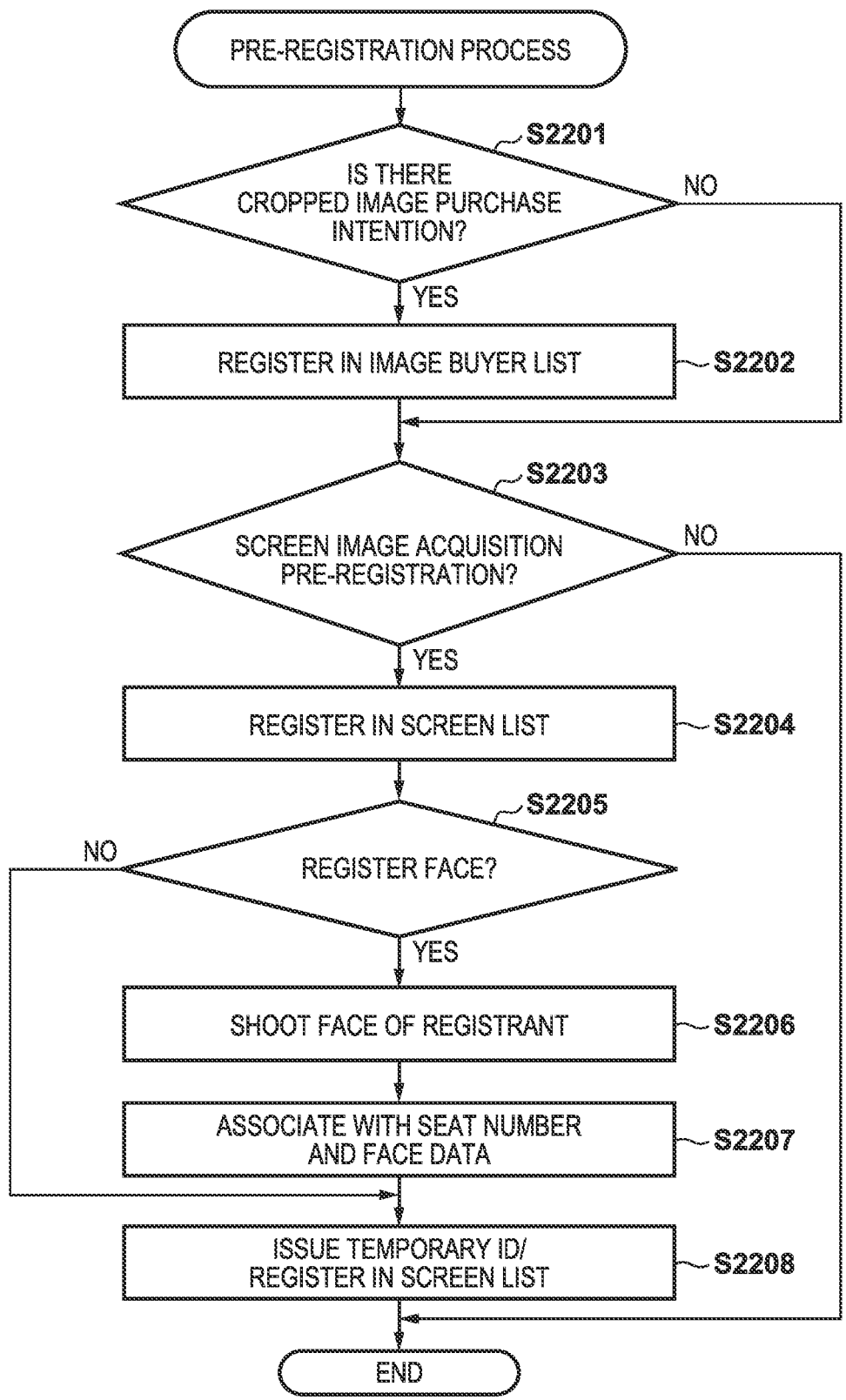

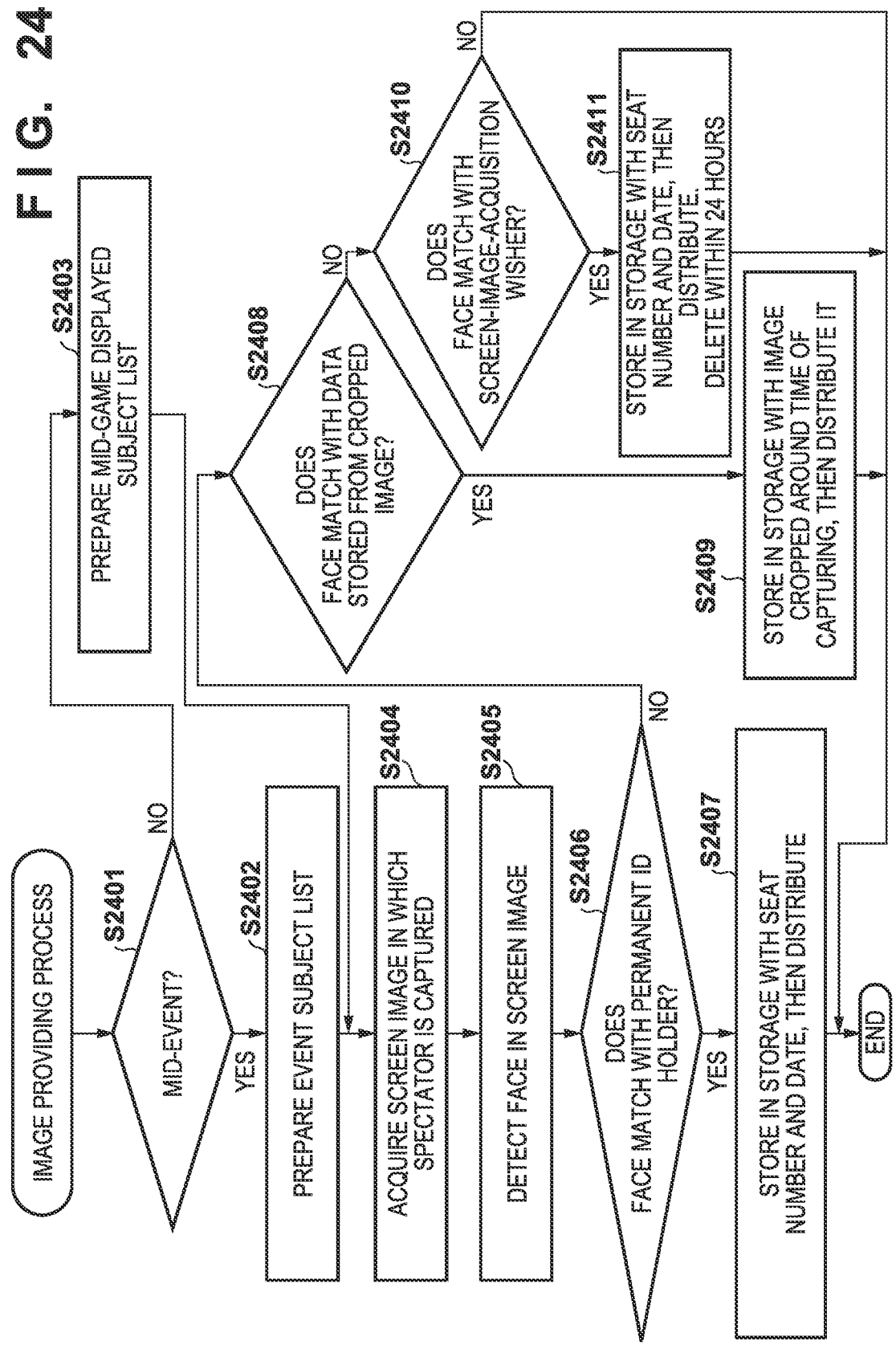

IMAGE PROVIDING SYSTEM AND METHOD FOR CONTROLLING SAME

CROSS-REFERENCE TO RELATED APPLICATIONS

This application is a Continuation of International Patent Application No. PCT/JP2020/024176, filed on Jun. 19, 2020, which claims the benefits of Japanese Patent Application No. 2019-115713, filed on Jun. 21, 2019; Japanese Patent Application No. 2019-122039, filed on Jun. 28, 2019; Japanese Patent Application No. 2019-122252, filed on Jun. 28, 2019; and Japanese Patent Application No. 2020-048159, filed on Mar. 18, 2020, all of which are incorporated by reference herein in their entirety.

BACKGROUND OF THE INVENTION

Field of the Invention

The present invention relates to an image providing system and a method for controlling the same, and more particularly, to a technique for when capturing and providing an image.

Background Art

There is a demand for capturing an image of a user enjoying a sports game or a tourism facility. In PTL 1, it is disclosed that when the user in the spectator stands inputs a capturing request such as a capturing range and capturing time, based on the inputted capturing request, the camera captures an area where there are spectators.

CITATION LIST

Patent Literature

PTL1: Japanese Patent Laid-Open No. 2007-142896

According to the method of PTL 1, there is a possibility that the image requested by the spectator cannot be provided when the number of images required at a time is larger than the number of cameras due to the spectator's request.

According to the method of PTL 1, when spectators are located at different positions, there is a possibility of not being able to respond to the capturing request of each spectator. On the other hand, if an attempt is made to satisfy the demands of all the spectators, there is a possibility that the amount of image data will increase, making it impossible to quickly perform provision of images.

According to the method of PTL 1, there is a possibility that an image in which the captured spectator cannot be specified, such as an image displayed on a screen in a venue, cannot be provided to a target spectator.

SUMMARY OF THE INVENTION

In view of any one of the above problems, the present invention provides, in one aspect thereof, an image providing system or an image providing apparatus capable of providing an image to more spectators.

In view of any one of the above problems, the present invention provides, in one aspect thereof, an image providing system or an image providing apparatus capable of quickly providing an image to more spectators.

In view of any one of the above problems, the present invention provides, in one aspect thereof, an image providing system or an image providing apparatus capable of providing an image to a spectator displayed on a screen.

According to an aspect of the present invention, there is provided an image providing system comprising: an acquisition unit that acquires position information about a position of a user designated by the user; and a control unit that controls the image providing system to: determine a range of an image that was captured by an image capturing unit, the range corresponding to the position information as a cropping range, before the image capturing unit starts a series of image capturing in which the image capturing unit captures a plurality of images, after the series of image capturing is started, apply cropping that cuts out a part of a captured image based on the cropping range, and during the series of image capturing, provide a cropped image to which the cropping has been applied in a way in which a user can obtain the cropped image.

According to an aspect of the present invention, there is provided a method for controlling the image providing system, the method comprising: acquiring information about a position to be a capturing target among a plurality of seats; instructing an instruction to an image capture apparatus about a capturing interval of image capturing for capturing image of which field of view includes the plurality of seats; and controlling the image providing system to change the capturing interval to be instructed to the image capture apparatus based on the information acquired by the acquiring.

According to an aspect of the present invention, there is provided an image providing system comprising: a display control unit that displays, on a display unit, an image of a spectator who is in any of a plurality of seats is captured; an acquisition unit that acquires information indicating face information of a spectator and individual information of each spectator; a matching unit that applies face detection to a spectator displayed on the display unit and matching against the face information; and a control unit that controls to provide an image of the spectator displayed on the display unit to a user corresponding to the face information matched by the matching unit.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 6 is a diagram illustrating a data structure according to the present embodiment.

FIG. 7 is a flowchart illustrating a ticket purchase process according to the present embodiment.

FIG. 8 is a flowchart related to pre-game setting according to the present embodiment.

FIG. 9B is a flowchart related to a post-start-of-game process according to the present embodiment.

FIG. 9CB is a flowchart related to a post-start-of-game process according to the present embodiment.

FIG. 10 is a flowchart illustrating an example of a cropping process according to the present embodiment.

FIG. 11A is a diagram illustrating an example of a seating arrangement according to the number of people in a group according to the present embodiment.

FIG. 11B is a diagram illustrating an example of a seating arrangement according to the number of people in a group according to the present embodiment.

FIG. 11C is a diagram illustrating an example of a seating arrangement according to the number of people in a group according to the present embodiment.

FIG. 13 is a diagram of an example of a data structure in which a cropping position calculation method is stored according to the present embodiment.

FIG. 14 is a diagram of an example of a data structure in which a cropping position calculation method is stored according to the present embodiment.

FIG. 20 is a flowchart illustrating another example of a series of image capturing process (during game) according to the present embodiment.

FIG. 21A is a flowchart illustrating another example of a series of image capturing process (during game) according to the present embodiment.

FIG. 22 is a flowchart related to a pre-registration process for a screen according to the present embodiment.

FIG. 24 is a flowchart related to a screen image provision process according to the present embodiment.

DESCRIPTION OF EMBODIMENTS

Figure 1A:
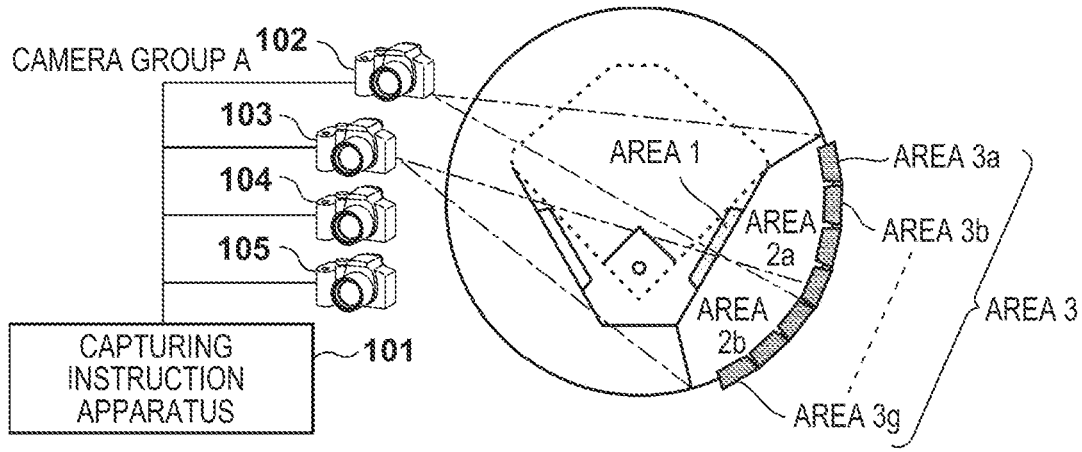
FIG. 1A is a facility arrangement diagram in an image providing system according to the present embodiment.

Embodiments of the present invention will be described below with reference to the drawings. The following embodiments do not limit the claimed invention. Although a plurality of features are described in the embodiments, not all of these features are essential to the invention. Also, the plurality of features may be arbitrarily combined. Furthermore, in the accompanying drawings, the same reference numerals are assigned to the same or similar components, and a repetitive description thereof is omitted.

Hereinafter, exemplary embodiments for carrying out the present invention will be described in detail with reference to the drawings. However, the components described in this embodiment are merely illustrative, and are not intended to limit the scope of the present invention only to them.

Figure 1B:
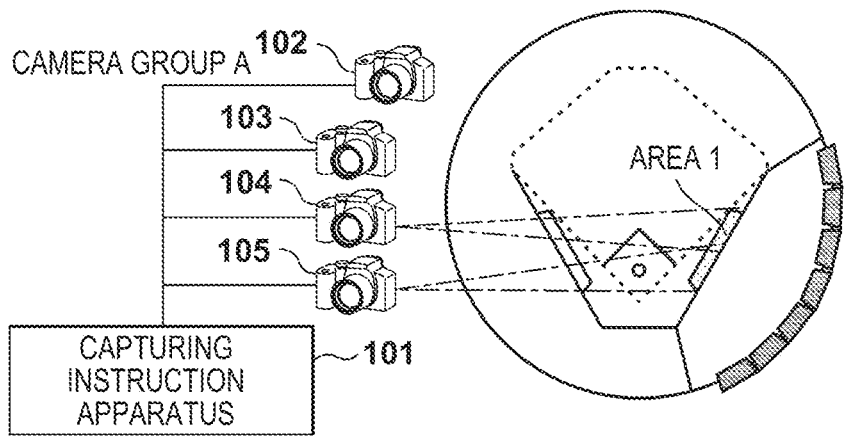
FIG. 1B is a facility arrangement diagram in the image providing system according to the present embodiment.
Figure 1C:
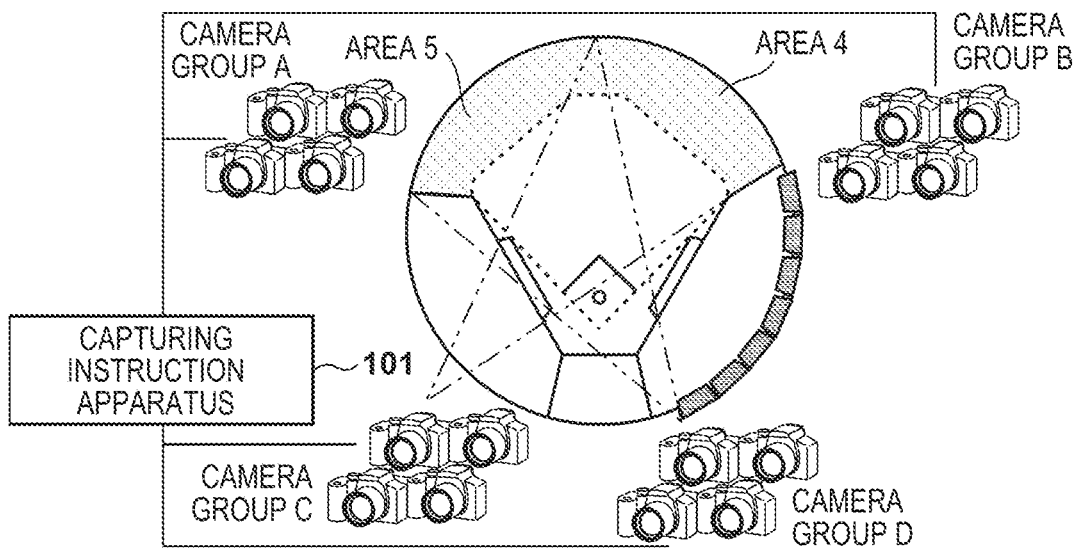
FIG. 1C is a facility arrangement diagram in the image providing system according to the present embodiment.

FIG. 1A to FIG. 1C are facility arrangement diagrams for remote control capturing in an image providing system according to the present embodiment. In FIG. 1A to FIG. 1C, for the convenience of explanation, a baseball stadium is used as an example, but the invention can be applied to stadiums where sports competitions are held, martial arts arenas, arenas where and concerts are held, theaters where plays and operas are performed, and other facilities where a large number of spectators can view from a fixed position.

In the examples of the baseball stadium illustrated in FIG. 1A to FIG. 1C, a capturing instruction apparatus 101 instructs the cameras 102 to 105 to capture the infield seats on the first base side at the same time. In the present embodiment, the number of cameras is assumed to be four in order to simplify the capturing, but the number of cameras is not limited for the present invention as long as it is within a range in which the capturing instruction can be physically simultaneously issued.

When capturing from the upper parts of the opposite spectator stand in a stadium, etc., the distance to the spectator (subject) is long, so even if a telephoto lens with a long focal length is attached, a certain number of spectators will fit within one frame. Therefore, it is necessary to perform a cropping process for each seat and each group. In addition, since a telephoto lens having a long focal length is expensive, when trying to reduce cost, the focal length cannot be increased, so the number of people falling within one frame increases, and thus the necessity for a cropping process increases. In addition, by fitting a plurality of spectators within the angle of view of one frame, an image of a plurality of spectators enjoying the game in one highlight scene can be acquired in one capturing, for example. At this time, since the number of people falling within one frame increases, the need for a cropping process increases.

Incidentally, with respect to the capturing instruction, two methods, which are interval capturing which is periodic capturing (e.g., an instruction to capture an image once every 10 seconds, etc.) and a manual capturing which is in accordance with the capturing intention of the operator, are provided.

In addition, depending on the facility, a position where an event such as a competition is easier to see may be set to a higher price, and a position where the event is difficult to see may be set to a lower price, and so, a plurality of types of tickets usually exist. FIG. 1A to FIG. 1C illustrate an area 1 close to the ground, an area 2 with the largest number of seats, and an area 3 that is a partitioned space. The area 1 is for a spectator who wants to watch from a closer place, and because the number of seats is limited, it is an area that is often watched from on special occasions with a small number of people, such as a family, rather than a unit of several tens of people. Therefore, providing a memorable image of only the members who came together leads to an improvement in the degree of satisfaction of the spectators. In the area 2, many fans who come to watch the game frequently are watching the game, and enthusiastic fans are sitting in clumps. In addition, in the area 2, spectators of various levels are included, such as spectators who have come to watch the game as a once-off experience and spectators who are not highly enthusiastic about the game itself. Therefore, it is an area where there are some spectators who want an image of when they are watching the game and some who think it is unnecessary, and the satisfaction level of the spectators is improved by providing an image in accordance with the intention of the spectators. In the area 3, the degree of satisfaction of the customer is improved by providing an image in which the game is being enjoyed live or a particular spectator has a good expression on their face. As described above, the needs of the spectators differ depending on the area. In order to meet the needs of all the spectators, it is necessary to prepare the captured images according to various patterns, but there is also a problem that if the amount of data increases, the cost increases, resulting in the spectators not being able to easily purchase the images. In addition, although the satisfaction level of the spectator with the game is further improved by providing an image while the spectator is watching the game, since the amount of data of the image is large, if an attempt is made to also process the image data of a spectator who is highly unlikely to purchase the image, it would take a long time to process the image, resulting in taking a long time to provide the image.

Since it can be determined that a spectator in areas 1 and 3 is more likely to purchase captured images, in FIG. 1A, the area 1 is covered by two cameras 102 and 103, but in FIG. 1B, the area 2 which is wider than the area 1 is similarly covered by two units of cameras 104 and 105. As a result, the number of people that fit in the image of the area 1 will be smaller and the spectators will appear larger, so the resolution of the cropped image will be higher, resulting in being able to obtain a more marketable image, which can lead to more purchases. Incidentally, in the area 3, by capturing a still narrower range than the area 1 by two cameras, the resolution of the cropped image is further increased. Since the cropped image with higher resolution can be acquired in the area 3, image analysis of the captured image is also possible, and structurally, in the area 3, there are often a plurality of spaces including a space for viewing, so it is possible to determine that there are more than a predetermined number of spectators in the space for viewing, select a better image by analyzing facial expressions, and so on, which makes it possible to obtain a more marketable image than in the area 1. Alternatively, in the area 1, the spectator may not always be at a position that can be captured by a camera. Therefore, using a panhead system capable of performing the camera swing by remote operation, a plurality of delimited spaces is observed by one camera, and when it becomes possible to capture the spectator, a specific space may be captured.

FIG. 1C illustrates a configuration diagram for instructing the respective camera groups to capture from the capturing instruction apparatus 101. The capturing instruction apparatus 101 is capable of instructing a plurality of camera groups A to D to capture as illustrated in FIG. 1C. The camera group C covers a wide area 4 of the outfield seat with four units, and the camera group D covers a wide area 5 of the outfield seat with four units.

The cameras 102 to 105 are a camera unit composed of an image capture element (image capture sensor) or the like configured by a CCD or CMOS element or the like for converting an optical image into an electric signal. The camera includes a lens group (capturing lens) including a zoom lens and a focus lens, a shutter having an aperture function, an image capture element, an A/D converter for converting an analog signal outputted from the image capture element into a digital signal, and a barrier covering the image capture system to prevent contamination or damage. The image processing unit in the camera performs resizing processing and color conversion processing such as predetermined pixel interpolation and reduction on data captured and obtained by the camera. Based on the calculation result obtained by the image processing unit, the CPU in the camera performs exposure control, ranging control, and AWB (auto white balance) processing. Image data for display captured by the camera and subjected to image processing by the image processing unit is displayed on a display 04 of a PC, which will be described later. Live view display (LV display) can be achieved by D/A converting digital signals, which are obtained by A/D converting signals captured by the camera by the A/D convertor and then stored in the RAM, by the D/A converter and sequentially transferring to the display 04 to display. The live view can be displayed in the capturing standby state of still images, the capturing standby state of moving images, and the recording time of moving images, and the captured subject images are displayed in almost real time. The CPU, in response to the capturing preparation instruction based on the user operation performed in an input device 06, controls the camera and the image processing unit so as to start the operation of the AF (autofocus) processing, AE (automatic exposure) processing, AWB processing, or the like. The CPU on the camera side, in response to a capturing instruction, performs control so as to start a series of operations of capturing processing (main capturing) such as, performing main exposure, reading out a signal from the image capture unit element, generating an image file by image processing of the captured image by the image processing unit, and then storing the image file in an external storage. The capturing instruction can be performed by user operation on the input device 06 of a PC 201a or pressing the camera-side shutter button. The camera is capable of capturing still images and moving images.

Incidentally, depending on the facility, due to the structure, the capturing distance and the illuminance from the camera position from which the capturing is performed differ for each area of the seat, and so, in the capturing of the present embodiment in which many areas are covered in a single instance of capturing, depending on these conditions, there may be a difference in the image quality; therefore, the price may be changed or the number of provided images may be increased depending on the image quality. In addition, rather than simply setting an image of a seat close to the ground and at a close distance to the camera at a high price, there are cases where a seat whose image quality improves depending on conditions such as brightness and the number of cameras is set at a high price.

Figure 2:
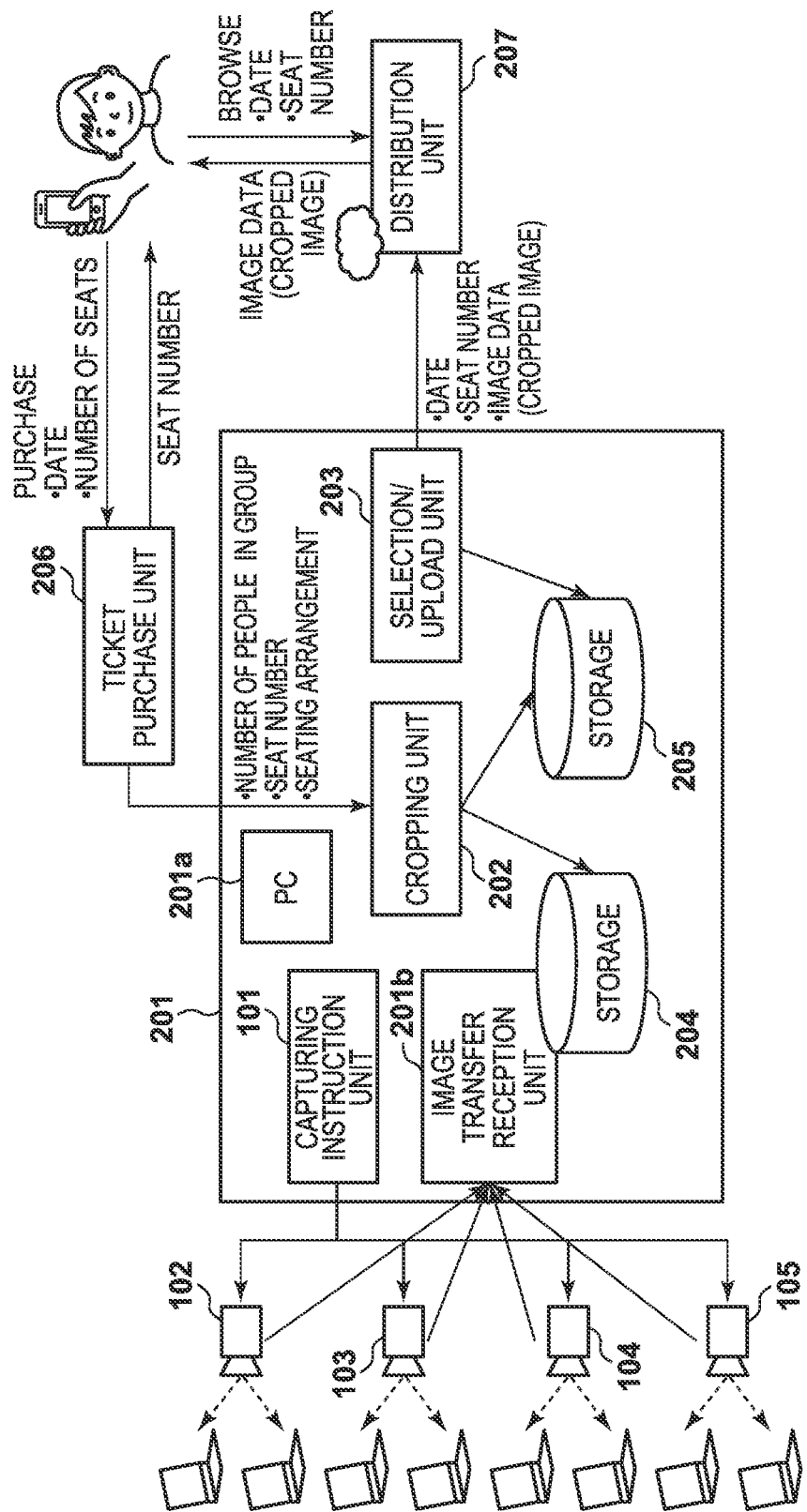
FIG. 2 is an overall configuration diagram of a system in an image providing system according to the present embodiment.

FIG. 2 is an overall configuration diagram of a system in the image providing system according to the present embodiment. An image processing apparatus 201 includes the capturing instruction apparatus 101, an image transfer reception unit 201b, a cropping unit 202, a selection/upload unit 203, and storages 204 and 205.

In FIG. 2, although each of the processing units 101, 201, 202, and 203 is described in one image processing apparatus 201, it may be a physically different processing apparatus, and the configuration of the processing unit is not limited for the present invention.

The capturing instruction apparatus 101 simultaneously issues capturing instructions to the cameras 102 to 105 in the same manner as in the FIGS. 1A to 1C. With respect to the capturing instruction, two methods, which are interval capturing which is periodic capturing (e.g., an instruction to capture an image once every 10 seconds, etc.) and a manual capturing which is in accordance with the capturing intention of the operator, are provided.

The image transfer reception unit 201b stores, in the storage 204, image data that is transferred from the camera side and is of images captured by the cameras 102 to 105. FTP (File Transfer Protocol), etc. is used as the protocol for sending and receiving image data.

The cropping unit 202 performs a cropping process on each image data in response to the transfer of the image data from the cameras 102 to 105 to the storage 204 and stores the cropped image and the seat number in the storage 205.

Although the storages 204 and 205 are represented here as separate storages, they may be physically the same.

When performing the cropping process, the number of people in the group, the seat number, and the seating arrangement purchased in advance are obtained from a ticket purchase unit 206, which will be described later, and based on that information, the cropping process is performed; the detailed process will be described later with reference to FIGS. 10 to 15.

The selection/upload unit 203 uploads the cropped image data, the seat number, and the event date and time information stored in the storage 205 to a distribution unit 207 (distribution server). When the capturing instruction apparatus 101 performs the interval capturing during the competition or event, a large number of cropped images are created, so that the operator can extract and select a scene in which the spectator is excited and upload the image to the distribution unit 207. The selection method is not illustrated, but the target image may be selected visually from the list of images, or the data of the corresponding time may be extracted by inputting a specific time, and the selection method is not limited for the present invention.

Conversely, when the capturing instruction apparatus 101 performs only manual capturing by the operator, a capturing instruction is usually performed in a scene where the spectator is excited, so all the images may be uploaded without particular selection.

The ticket purchase unit 206 is a mechanism for a user to purchase a ticket, and processing at the time of purchase will be described later with reference to FIG. 8. The user inputs the date and the number of seats they want to purchase and makes a payment, thereby obtaining the desired number of seat numbers.

The distribution unit 207, using the event date and the seat number inputted by the user as a key, presents the image data group of the corresponding seat number of the corresponding date to the user. Regarding the user input, the user may look at the ticket and manually input the ticket, or a QR code (registered trademark) or the like may be printed on the ticket and read and recognized by a smart phone, and so the input method is not limited for the present invention.

The presentation to the user may be a smartphone application or may be in the form of a web application that is accessed using a browser, and the presentation method is not limited for the present invention.

Figure 3:
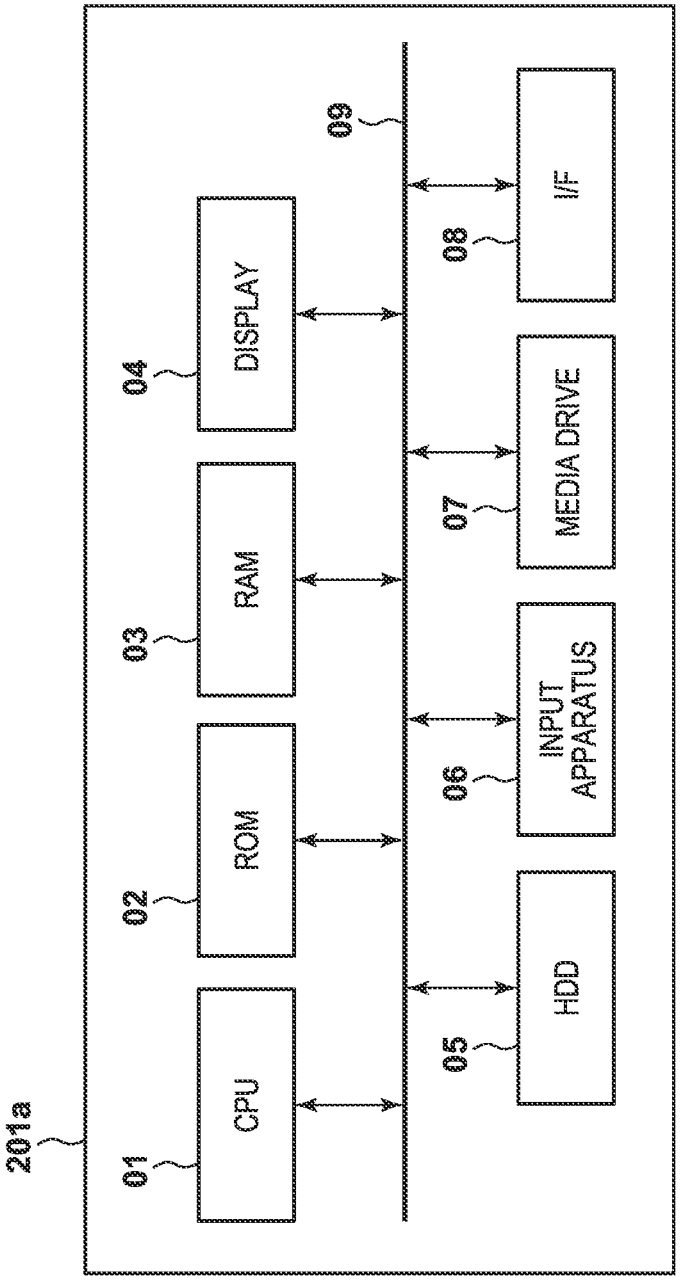
FIG. 3 is a block diagram of an image processing apparatus according to the present embodiment.

FIG. 3 illustrates an example of a configuration of the PC 201a (personal computer) in the image processing apparatus 201 as an example of an apparatus to which the present invention can be applied. The image processing apparatus 201 may comprise a plurality of electronic devices or may comprise a single PC.

In FIG. 3, a CPU 01, a RAM 03, a ROM 02, a display 04, an input device 06, and an I/F 08 are connected to an internal bus 09. The respective units connected to the internal bus 09 can exchange data with each other via the internal bus 09.

The RAM 03 is configured by, for example, a RAM (volatile memory using a semiconductor device, or the like). The CPU 01 controls each unit of the PC 201a using the RAM 03 as a work memory in accordance with a program stored in the ROM 02, for example. The ROM 02 stores image data, audio data, other data, various programs for operation of the CPU 01, and the like. The ROM 02 consists of, for example, a hard disk (HD), a ROM, or the like.

The display 04 displays an image, a GUI screen comprising a GUI (Graphical User Interface), or the like based on the control of the CPU 01. The CPU 01 controls each part of the PC 201a so as to generate a display control signal in accordance with the programs, generate a video signal to be displayed on the display 04, and output the video signal to the display 04. The display 04 displays the video based on the outputted video signal. The PC 201a itself may have a configuration up to an interface for outputting video signals to be displayed on the display 04, and the display 04 may be configured by an external monitor (such as a TV).

The input device 06 is an input device for accepting a user operation including a character information input device such as a keyboard, a pointing device such as a mouse or a touch panel, a button, a dial, a joystick, a touch sensor, a touch pad, and the like. Incidentally, the touch panel is an input device configured to be planarly superimposed on the display 04, so that the coordinate information corresponding to the contacted position is outputted.

FIG. 4A to FIG. 5B are examples of setting a cropping position for each seat according to the present embodiment.

Figure 4A:
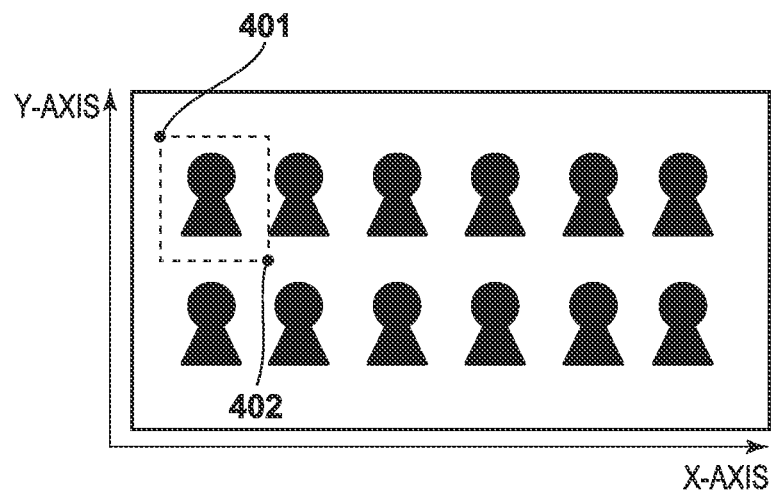
FIG. 4A is a diagram illustrating an example of setting a cropping position for each seat according to the present embodiment.
Figure 4B:
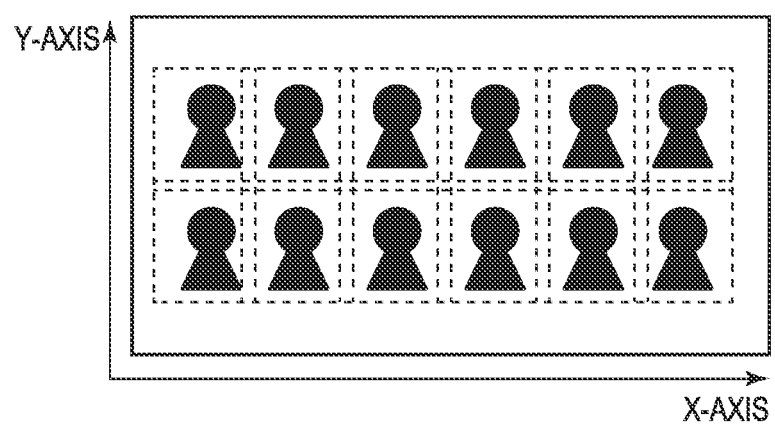
FIG. 4B is a diagram illustrating an example of setting a cropping position for each seat according to the present embodiment.

FIG. 4A and FIG. 4B are examples of setting a cropping position for an image captured by a camera substantially in front of the spectator. As illustrated in FIG. 4A, a rectangular cropping position is defined for each of the seats, and the coordinate system is defined such that the horizontal direction is the X-axis and the vertical direction is the Y-axis; the coordinates of a top-left vertex position 401 and a bottom-right vertex position 402 are stored as a data structure illustrated in FIG. 6, which will be described later.

By designating the above operation for each seat included in the captured images, the cropping positions of all the seats are designated as illustrated in FIG. 4B. Although the rectangle is exemplified here as a rectangle, the shape need only be representable by a coordinate system, such as defining a shape using a polygon or an ellipse, and the form of the shape is not limited for the present invention.

Figure 5A:
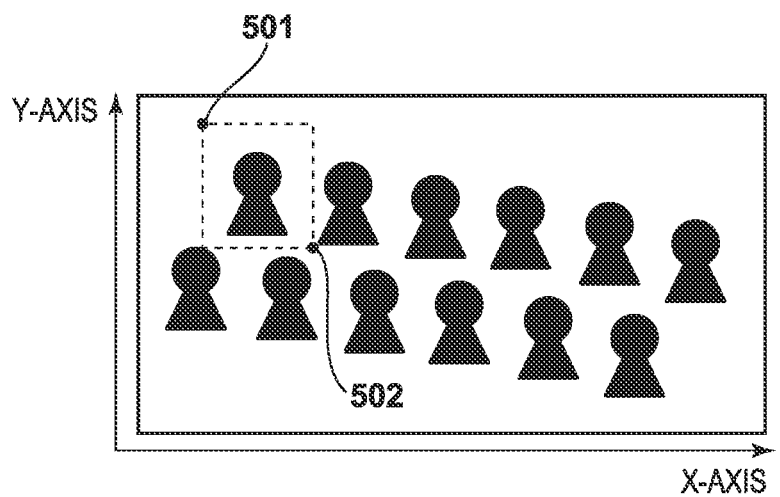
FIG. 5A is a diagram illustrating an example of setting a cropping position for each seat according to the present embodiment.
Figure 5B:
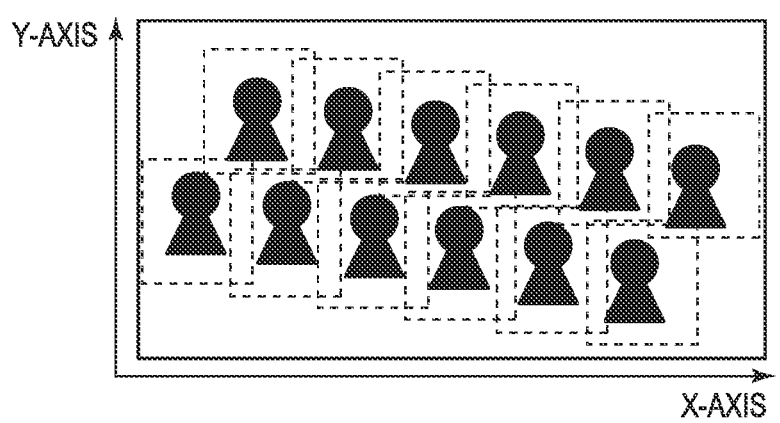
FIG. 5B is a diagram illustrating an example of setting a cropping position for each seat according to the present embodiment.

FIG. 5A and FIG. 5B illustrate setting of the cropping position for an image captured by the camera slightly diagonally above the spectator; however, by defining a rectangular cropping position for each seat as in the example of FIG. 4A and FIG. 4B, then defining the X- and Y-axes coordinate system, it is possible to store, as a data structure in FIG. 6 to be described later, the coordinates of the top-left vertex position 501 and the bottom-right vertex position 502 even if the seat position is skewed.

FIG. 6 is an example of a data structure for storing the cropping position of each seat in the present embodiment. A data structure 600 has a row number 601, a seat number 602, a camera number 603, an X-coordinate 604 of a top-left vertex coordinate, a Y-coordinate 605 of a top-left vertex coordinate, an X-coordinate 606 of a bottom-right vertex coordinate, and a Y-coordinate 607 of a bottom-right vertex coordinate.

In the data structure 600, the X- and Y-coordinates are managed as separate columns but may be managed in a single column as list information such as (X, Y). Although the row number 601 and the seat number 602 are numerical data in FIG. 6, character string data such as an alphabet may be used. Numerical data representing pixel positions are stored in coordinate information 604 to 607.

In the present embodiment, a description will be given of providing an image by capturing a photograph setting a spectator who is watching a baseball game as a user and cropping an image of spectators who came in a group. However, the example of the baseball game described in the present embodiment is an example, and the present invention can be applied to other sports games or places such as tourist spots and plays. The present invention can also be applied to a place of an entertainment show including a concert, or to a case where a spectator who is watching the entertainment is set as a user.

The ticket purchase process in the present embodiment will be described with reference to FIG. 7.

FIG. 7 illustrates the process for when purchasing a ticket in an application or Internet site where a user purchases a ticket. This process is realized by the CPU 01 deploying the program stored in the ROM 02 (non-volatile memory) in the RAM 03 (system memory) and then executing the program. Although the processing can be started independently regardless of the state of a camera or an operation unit, the processing may be started when the camera is powered on and the user operation to the operation unit can be accepted.

In step S701, the CPU 01 accepts an input of the number of tickets to be purchased from the user.

In step S702, the CPU 01 accepts, from the user, an input of whether or not they intend to purchase an image. Regarding the input in step S702, configuration may be taken such that the user can directly select whether or not to purchase the image on the purchase screen or the ticket and image purchase are in a set and the purchase of the ticket and the purchase of the image can be selected at one time. Also, some seats may be in a set with image purchase without the user making a selection, and the user may be assumed to have an image purchase intention at the time the user has selected the target seat.

In step S703, the CPU 01 determines whether or not there is image purchase intention in the input in step S702. If it is determined that the user has an image purchase intention, the process proceeds to step S704; otherwise, the process proceeds to step S706.

In step S704, the CPU 01 selects the seat designated by the user. At this time, configuration may be taken such that by the user selecting one representative seat, a plurality of patterns of seat positions corresponding to the number purchased inputted in step S701 is presented, enabling the user to easily select the seats. In the image cropping process described later with reference to FIG. 10, the cropping range is changed in accordance with the designation of the seat position by the user.

In step S705, the CPU 01 generates group information based on the information received in step S704. The group information is information in which the representative seat and the seat position of the tickets simultaneously purchased and inputted in step S701 are associated. Even if there is one user, in step S705, the information is generated in association with the seat as the group information. The group information may be such that other seats can be added to the same group by inputting information described on tickets that have not been purchased at the same time through an application or an Internet site. However, it is preferable that the seats to be grouped are adjacent to each other vertically or horizontally. This is because the seats that are distant from each other may be captured by different cameras, so when cropping, the seats may not fit within a single cropping range. Also, if the cropped image contains many other seats that are not included in the group, the size of each individual becomes smaller.

In step S706, the CPU 01 selects the seat designated by the user.

Next, a pre-start-of-game setting process in the present embodiment will be described with reference to FIG. 8. This process indicates the process performed by the image processing apparatus 201 before the start of the game. This process is started when the image processing apparatus 201 is powered on before the game and an instruction to start preparation of the target game is given from the operator of the system, or a predetermined time prior to the game such as three hours before or the day before the game. This process is realized by the CPU 01 deploying the program stored in the ROM 02 (non-volatile memory) in the RAM 03 (system memory) and then executing the program.

In step S801, the CPU 01 is connected to the distribution unit 207 and the ticket purchase unit 206.

In step S802, the CPU 01 acquires ticket information of a target game from the ticket purchase unit 206. The ticket information includes information on the number of tickets purchased, the seat position information, and the seating arrangement of the group simultaneously purchased, which are necessary at the time of the cropping process. Further, in order to select a more marketable image, information on the type of seat, information on the area such as whether the seat is in infield, outfield, or VIP, information on whether or not the seat in a capturing target area, information on whether or not the seat is non-designated or designated, information on whether or not the user is a frequent spectator, information on whether or not the user is in a fan club, and the like are also included.

In step S803, the CPU 01 calculates the cropping range based on the information acquired in step S802. Using the number of people and arrangement pattern of the group acquired in step S802, the calculation method of the cropping position for each of the numbers of people and patterns defined in FIGS. 13 and 14, which will be described later, are acquired, and the cropping range is calculated. Here, the cropping range refers to a rectangle enclosed in two vertices, X- and Y-coordinates of the top-left vertex position of the rectangle and X- and Y-coordinates of the bottom-right vertex position, of the rectangle to be cropped. Although a rectangle defined by two vertices is used here, the rectangle need only be representable by a coordinate system, such as defining a rectangle using a polygon or an ellipse, and the form of the rectangle is not limited for the present invention.

FIGS. 13 and 14 are diagrams of examples of a data structure in which a cropping range calculation method is stored according to the present embodiment. FIG. 13 is an example of a definition for an image captured from approximately in front of the spectators as in FIG. 4A and FIG. 4B, and FIG. 14 is an example of a definition for an image in which the spectators were captured somewhat diagonally as in FIG. 5A and FIG. 5B.

FIGS. 13 and 14 manages a number of people in a group 1301, a seating arrangement pattern 1302, a top-left vertex position X-coordinate calculation method 1303, a top-left vertex position Y-coordinate calculation method 1304, a bottom-right vertex position X-coordinate calculation method 1305, a bottom-right vertex position Y-coordinate calculation method 1306, and an out-of-group seat information 1307.

The number of people in a group 1301 and the seating arrangement pattern 1302 coincide with the number of people in a group and seating arrangement purchased that was acquired in advance from the ticket purchase unit 206. Although in the example of FIGS. 13 and 14, the coordinate calculation methods 1303 to 1306 use the cropping position information of any of the seat positions in the group, but a specific number of pixels or a calculation formula may be defined.

The out-of-group seat information 1307 defines the information of the seat positions which fall within the rectangle in the seating arrangement pattern but are not purchased as seats in the group.

In step S804, the CPU 01 prepares face data. As the face data, face data of a user who is a frequent spectator, that is, a spectator whose face has been detected many times in the past or a spectator who is in a fan club, is prepared based on the information acquired in step S802. As a result, when there is a spectator determined to coincide with the face in the face data in the captured image, the images of the specific spectator can be associated and collected as data and provided to the specific spectator all together. In addition, regarding the spectator in the fan club, even if they do not indicate an image purchase intention every time at the time of ticket purchase, the images are automatically collected, making it possible to collectively look back after the end of the game season. Depending on the spectator, the frequency of watching games varies greatly, so in one game, there may be a spectator that wants multiple images and a spectator that is fine with getting one image per game but wants an image from all the games that they watched. Therefore, by preparing the face data as described above, it is possible to provide an image without the frequent spectator having to perform an operation for indicating an image purchase intention every time. In addition, even if the spectator forgets the operation for indicating each time an image purchase intention, the image can be provided. In addition, images of specific spectators can be collected even if the spectator sits in a non-designated seat where the seat position is unknown. In addition, a plan for the spectator to purchase an image may be provided separately from the purchase of the game ticket instead of the information at the time of purchase of the ticket acquired in step S802, and when the plan is selected, face data may be registered so that the state of the spectator watching the game can be provided as an image each time. In the above case, by preparing face data, it is possible to smoothly provide an image to a spectator during a game.

In step S805, the CPU 01 sets the clocks of the respective cameras to the same time so that the capturing times of the images captured by the cameras 102 to 105 coincide with each other.

In step S806, the CPU 01 inputs a capturing trigger. The capturing trigger may be an interval capturing period such as 10 seconds or 20 seconds or based on detection such as in response to the cheer of the spectator becoming equal to or larger than a predetermined value. In addition, a control unit for analyzing the shot state of the game or analyzing the game data may be provided, and the interval may be shortened or a switch may be made to moving image capture in accordance with the game score, the progress of the game, and the position of the player. In addition, interval capturing may be stopped during a break time, and interval capturing may be started at a time when an event such as a cheer battle or a quiz occurs during the break time. It is needless to say that manual capturing instructions may be combined.

In step S807, the CPU 01 actually starts the cameras and performs capturing and cropping processes as a system test. The setting of the capturing conditions that accords with the brightness of the day and the degree of light entry may be performed based on the captured image, and it may be confirmed whether the target seat can be cut out when the captured image is cropped based on the coordinates associated with the seat. Incidentally, by placing a subject serving as an index point on the seat side, it may be confirmed whether the subject in the image captured by the camera is at the predetermined coordinates, the focus position has no problem, or the like. In addition, since this system is operated for each event, data of a previous event may remain in some cases, so deletion of camera data and organization, deletion, and back up of data in the system may be performed at this timing.

In step S808, the CPU 01 sets the capturing condition based on the system test of step S807.

Figure 9A:
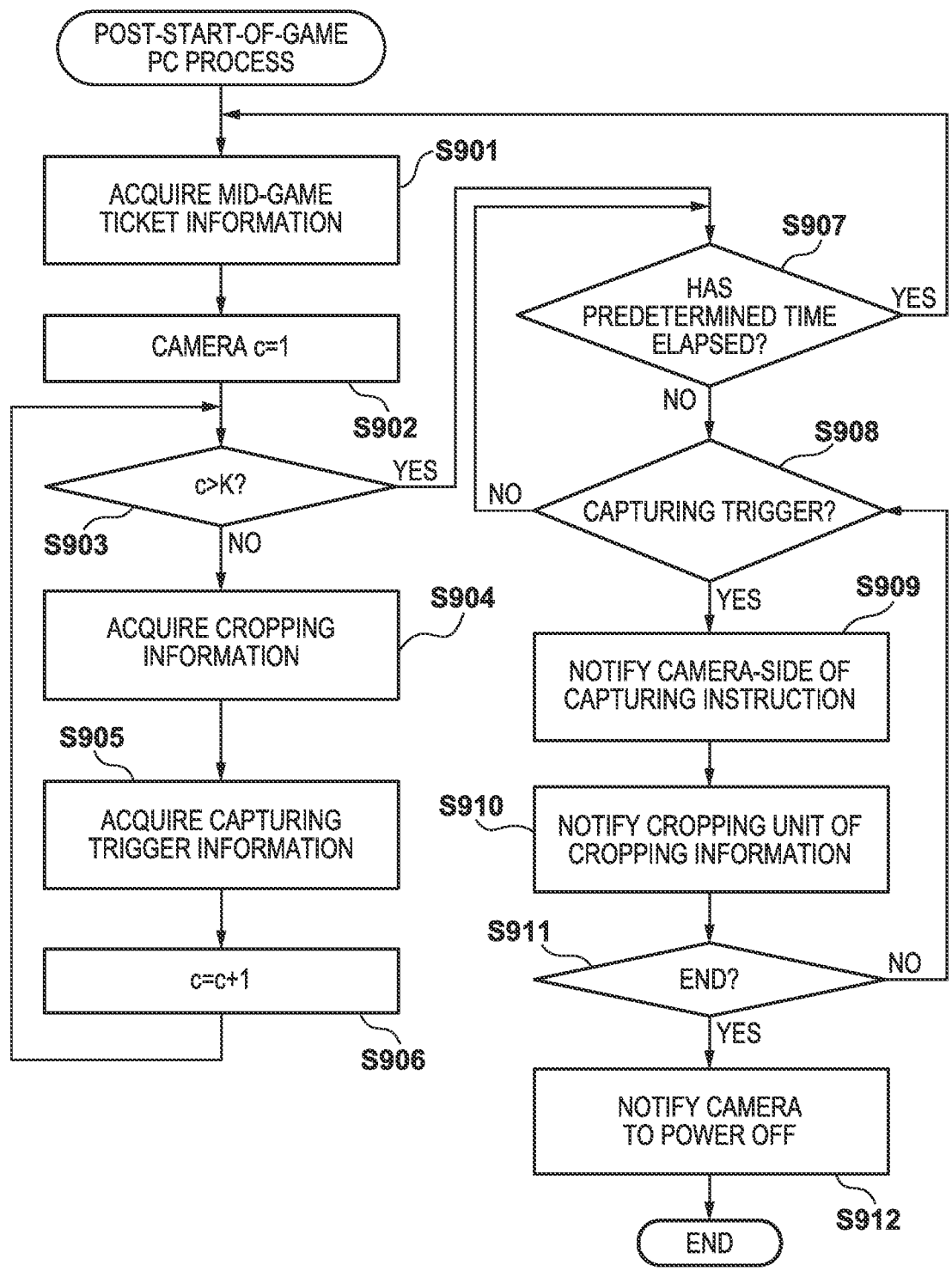
FIG. 9A is a flowchart related to a post-start-of-game process according to the present embodiment.
Figure 9C:
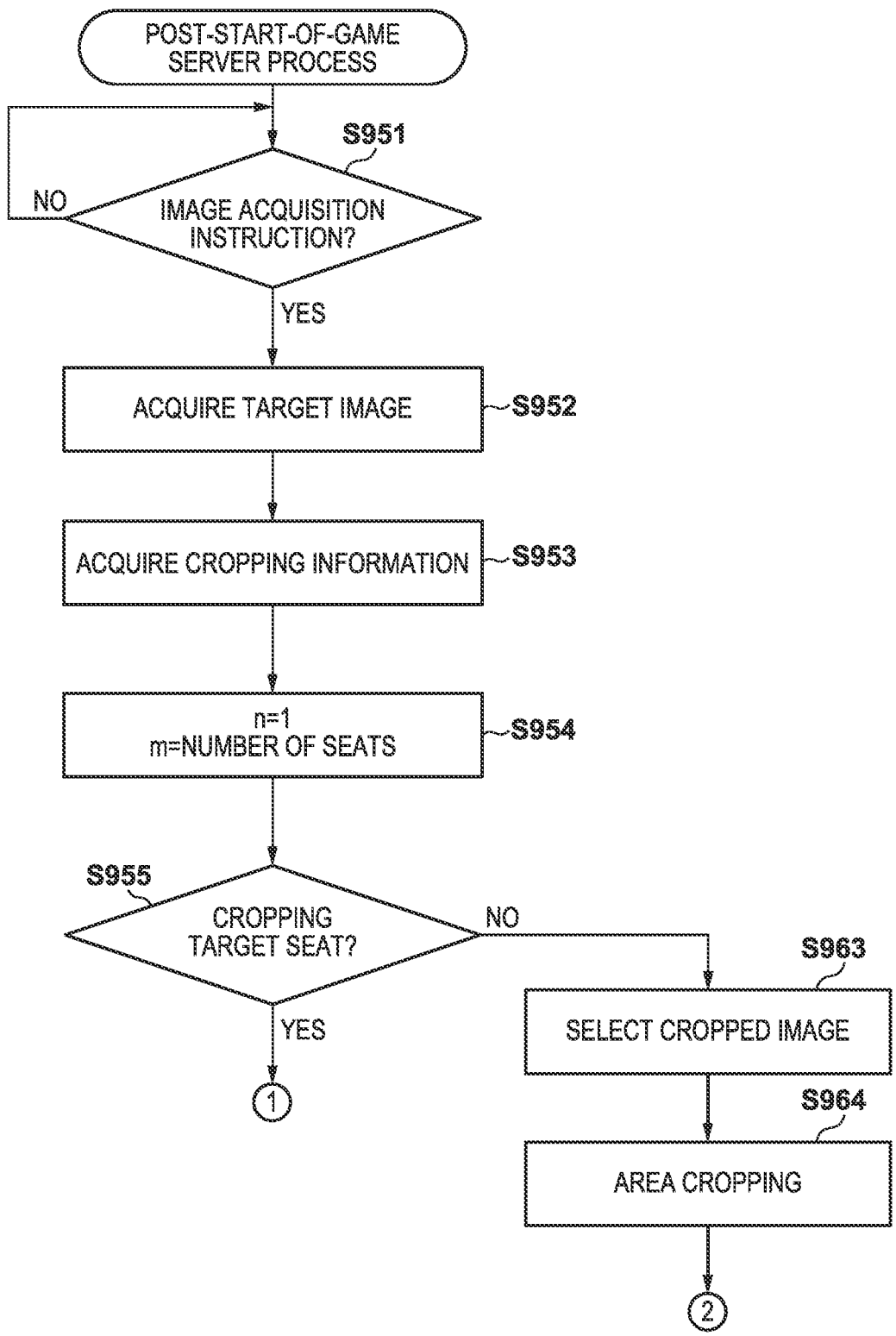
FIG. 9CA is a flowchart related to a post-start-of-game process according to the present embodiment.

Next, the post-start-of-game process is illustrated using FIGS. 9A to 9CB. FIG. 9A is a process of the image processing apparatus 201, FIG. 9B is a process related to capturing, and FIGS. 9CA and 9CB are a process for cropping and distributing an image. Each process is started before the game is started or before the pre-start-of-game capturing is started. This process is realized by the CPU 01 deploying the program stored in the ROM 02 (non-volatile memory) in the RAM 03 (system memory) and then executing the program.

In step S901, the CPU 01 acquires mid-game ticket information. The mid-game ticket information is information related to a ticket purchased after the game is started or purchased after the process of step S802 of FIG. 8. This information may be acquired from the ticket purchase unit 206 or may be notified to the image processing apparatus 201 from the ticket purchase unit 206 side periodically or every time there is an update.

In step S902, the CPU 01 obtains information about the camera corresponding to camera c=1. In step S902, information about the capturing range of the camera c=1 and the target seat are obtained.

In step S903, the CPU 01 determines whether or not camera c to be processed now is larger than the total number of cameras K, and if it is larger, it is assumed that the process has been completed for all the cameras, and the process proceeds to step S907. Otherwise, the process proceeds to step S904.

In step S904, the CPU 01 acquires the cropping information for the range of the seats to be captured from the position of the target camera c.

In step S905, the CPU 01 acquires the capturing trigger for the range of the seats to be captured from the position of the target camera c. For example, when a team A and a team B play against one another, it may be better to change the capturing interval period between the offensive and defensive timings. Depending on the type of seat, it may be better to perform capturing at a higher frequency. Therefore, by acquiring the capturing trigger depending on the seat included in the capturing range of the camera, it is possible to not miss a capturing opportunity without capturing a lot of images that are highly unlikely to be provided to the spectator. Note that the capturing trigger of step S905 may be the same for all the cameras.

If new tickets have been purchased, or if the spectator has indicated a new image purchase intention, that is, if a new cropping group has produced, the process of steps S803 and S804 of FIG. 8 is performed in steps S904 and S905.

In step S906, similarly to step S902, the CPU 01 sets camera c=c+1, and then acquires information about the next camera.

In step S907, the CPU 01 determines whether a predetermined time has elapsed. In a case where the determination of step S907 is performed for the first time after the process of FIG. 9A is started, the predetermined time is measured by time from step S901, and for the second and subsequent times, the predetermined time is measured by time from when it was determined Yes in the previous determination of step S907. Step S907 for acquiring mid-game ticket information at predetermined time intervals. If it is determined YES in step S907, the process proceeds to step S901; otherwise, the process proceeds to step S908.

In step S908, the CPU 01 determines whether or not there is a capturing trigger that has been acquired in step S905. If it is determined Yes in step S908, the process proceeds to step S909; otherwise, the process proceeds to step S907.

In step S909, the CPU 01 notifies the camera-side of an instruction to shoot.

In step S910, the CPU 01 notifies the cropping unit 202 of the cropping information. Since the information on the cropping information and the capturing trigger is updated every predetermined amount of time, the spectator who purchased the ticket in the middle of the game can also obtain the cropped image starting from the middle of the game.

In step S911, the CPU 01 determines whether or not to end the process, that is, whether or not the game ended and to end the capturing. To end the process, the CPU 01 proceeds to step S912, and otherwise, proceeds to step S901.

In step S912, the CPU 01 notifies the camera to power OFF.

As described above, in FIG. 9A, since the cropping information is sent substantially simultaneously with the capturing instruction to the cropping unit 202, it is possible to perform the registered cropping process quickly after capturing. By the time an image is sent from the camera side to the storage 204, the cropping unit 202 has already recognized the group to be cropped and calculated the cropping range, enabling the cropping process to be performed quickly and the spectator to confirm the image.

Next, a process related to capturing of FIG. 9B will be described. The process of FIG. 9B is a process performed by the respective cameras.

In step S930, the CPU 01 sets the camera side to acquire the capturing condition.

In step S931, it is determined whether or not a capturing instruction has been issued on the camera side, and if a capturing instruction has been issued, the process proceeds to step S932, and if not, a capturing instruction is awaited.

In step S932, capturing is performed on the camera side under the set capturing condition.

In step S933, the CPU 01 performs control for the image to be transferred from the camera to the image transfer reception unit 201b, and the transferred image data is stored in the storage 204. Alternatively, the image captured by the camera is sequentially transferred to the storage 204.

In step S934, the CPU 01 determines whether or not to end the process of FIG. 9B. The determination of step S934 is Yes when an instruction to power the camera off is received in step S912 of FIG. 9A. When it is determined in step S934 to end the process of FIG. 9B, the process of FIG. 9B ends, and otherwise, the process proceeds to step S931.

Next, a process of cropping and distributing images will be described with reference to FIGS. 9CA and 9CB.

In step S951, the CPU 01 determines whether or not an instruction to acquire an image has been given. The instruction to acquire an image is an instruction to acquire an image captured around when an event occurred such as, in the case of baseball, the time at which a home run occurred or the time at which a fine play occurred, based on the clock time set in step S805 of FIG. 8. The image acquisition instruction is performed in accordance with the occurrence of the event time. It should be noted that, for example, the CPU 01 may analyze the game even when it is not the event time and when an event occurs, simultaneously perform the image capture instruction and the image acquiring instruction.

In step S952, the CPU 01 acquires the target image from the storage 204.

In step S953, the cropping unit 202 acquires cropping information.

In step S954 and subsequent processes, the cropping process is started.

In step S954, the cropping unit 202 acquires information of a seat that is n=1. Then, the number of seats in the capturing range of the camera that has captured the image to be cropped now is assumed to be m. In the present embodiment, n=1 to m is assumed to be the seat number for the sake of simplicity, but the present invention is not limited to this, and if all of the seats captured by one camera and is set as a cropping target are covered, the seats may be linked to the seats that are actually used in the stadium. In order to cover a spectator seat with multiple cameras, the capturing range of a camera may overlap with the capturing range with another camera. Even if the spectator is being captured by two cameras, an image cropped from an image captured by one of the cameras is provided. Therefore, the capturing range and the cropping range of the camera may be different. In step S954, the number of seats in all the cropping ranges is acquired as m. The cropping range may change during the game or may be determined in advance on the stadium side.

In step S955, the CPU 01 determines whether or not the seat is in the area to be cropped. In the stadium, there is a possibility that a blind spot of a camera is caused by a net, a pole, a roof, or the like or that there is an area where capturing is prohibited. Further, in an area, such as a non-designated seat, where the position of the spectator is not known, the cropping corresponding to the position of the seat is not performed in the first place. Therefore, the determination of step S955 is No. As will be described later, even in a non-designated seat, cropping by face detection or cropping of a wider range can be performed. If it is determined Yes in step S955, the process proceeds to step S956; otherwise, the process proceeds to step S963. It should be noted that it is also possible to indicate to the spectator, at the time of purchase of the ticket or in the vicinity of the seat, that the area is an area where the image cannot be purchased.

In step S956, the CPU 01 determines whether or not the seat number n for which it is currently being determined whether or not it is a cropping target is smaller than the number of seats m within the cropping range. That is, it is confirmed whether or not the determination of whether or not to perform cropping has been completed for all the seats in the cropping range. If it is determined Yes in step S956, the process proceeds to step S957; otherwise, the process proceeds to step S965.

In step S957, the CPU 01 determines whether or not the seat n is a cropping target seat. Whether or not the seat is a cropped target is determined by whether or not the spectator has indicated an image purchase intention in FIG. 7. That is, the determination of step S955 is Yes when the seat is included in the cropping group, and otherwise, is No.

In step S958, the CPU 01 selects a cropped image, which is the original image to be cropped, from the image acquired in step S952. Regarding the selection of the cropped image, the image with the best facial expression or a larger motion compared with the preceding and succeeding images may be selected in accordance with the state of the spectator of the cropping group of the seat n currently being targeted. Alternatively, the image selected may not be changed for each cropping group, and the image may be manually selected, or the motion of the spectator in the cropping range may be quantified, and then the image that appears to have the largest motion may be selected.

In step S959, the CPU 01 executes a cropping process. The cropping process will be described later with reference to FIG. 10.

In step S960, the CPU 01 sets seat n=n+1. When the seat n is included in the cropping group for which the cropping process has already been performed, n+1 is performed again to search for a seat for which the determination of step S957 has not yet been made.

In steps S961 and S962, the process when the spectator is not in the group cropping of the spectator of the seat n will be described. In the present embodiment, cropping is performed for the area in association with the seat number so that the spectator can obtain an image after the game. That is, instead of determining the cropping range so as to include the spectators that made a purchase at the same time and exclude the other spectators as in the group cropping, the cropping is performed for a predetermined number of people, such as 30 people or 50 people. As a result, it is possible to reduce the time required for cropping and the amount of data as well as quickly provide an image to a spectator who is a group cropping target and later provide an image to a spectator who is not a group cropping target.

In step S961, the CPU 01 selects a cropped image, similarly to step S958. In the case of area cropping, since the cropped image is not stored in accordance with the spectator of each seat, the selection of cropped image corresponding to the spectator of the seat n is not performed. In the case of area cropping, an image may be manually selected, or the movement of the spectator in the cropping range may be quantified and then an image whose numerical value is of the largest movement may be selected. Alternatively, an image in which the facial expression of the spectator whose face data is prepared in advance is good or in which the movement is larger may be selected. As described above, even if the spectator is not a group cropping target, by selecting an image in which the facial expression of the spectator who is likely to purchase the image is good or where there is a lot of movement, it is possible to satisfy a larger number of spectators who would purchase the image in the future. If an image with a good facial expression is stored for each spectator, the amount of data increases, leading to an increase in cost and taking time to retrieve data. By selecting an image preferentially for frequent spectators who are likely to make a purchase, images can be provided more quickly and at a lower cost. Note that the spectator whose face has been detected may be notified of the images of the target spectator all together every predetermined number of games, such as 10 games or 5 games, or the spectator may be notified of the image at the time of watching the next game and prompted to purchase the image. Further, by presenting an image shot in the previous game to the spectator at the time of purchase of the ticket of the next game, the spectator may be enabled to grasp what kind of image will be shot, making it easier to determine whether or not to purchase the image.

In step S962, the CPU 01 performs area cropping. As described above, the area cropping crops an image separated by a predetermined number of people. When the seat n is already included in the image subjected to area cropping in the process for another seat n, the area cropping is not performed again, and the image data amount is reduced.

In steps S963 and S964, the same process as step S961, step S962 is executed. If the seat is a non-designated seat which is not a cropping target seat, a process based on face detection may be performed, and in a case where the seat is a cropping target seat and the spectator is not in a group cropping range, area cropping need not be performed. In addition, regarding the seats in which some enthusiastic fans are sitting together or a group is seated, an area cropping range may be set to be wider. For example, users wearing clothes of the same color may be set as the cropping range. This makes it possible to fit, in one image, a group wearing a uniform of the team that they are supporting.

In step S965, the CPU 01 determines whether or not there is face data in the cropped image. If there is face data, the process proceeds to step S966, and otherwise, proceeds to step S967.

In step S966, the CPU 01 associates the IDs of the respective spectators with the images and sets the image flag ON for the game that the spectators are watching. If the image flag is ON, it is possible to present to the spectator that there is an image shot in which game.

In step S967, the CPU 01 uploads the cropped image to the distribution unit 207 so that the spectator who is a group cropping target can view the image. Note that the cropped image may be presented even if it is the spectator is not a group cropping target. At this time, for the spectators who are not a group cropping target, characters such as "sample" may be added as a watermark. Image data that has not been uploaded is deleted from the storage 204 or stored with reduced image quality, thereby reducing the size of the image, which leads to cost reduction. However, the image data may be stored for a predetermined period after the game with the images themselves selected in steps S958, S961 and S963, or the respective spectators may be notified prior to deletion.

FIG. 10 is a flowchart illustrating an example of a cropping process according to the present embodiment. This process is realized by the CPU 01 deploying the program stored in the ROM 02 (non-volatile memory) in the RAM 03 (system memory) and then executing the program.

The CPU 01 reads out the number of people in a group, the seat number, and the seating arrangement purchased in advance acquired from the ticket purchase unit 206 (step S1001).

FIG. 11A to FIG. 11C are examples of a seating arrangement according to the number of people in a group according to the present embodiment. FIG. 11A is an example of a seating arrangement of a group of four people; in pattern (1), four people are lined up side by side, and in pattern (2), they are lined up two people in the front and back respectively. The pattern is merely an example, and the combination of the shape of the pattern and the number of people is not intended to limit the present invention.

Similarly, FIG. 11B is an example of a seating arrangement for a group of five people, and FIG. 11C is an example of a seating arrangement for a group of six people.

Figure 12:
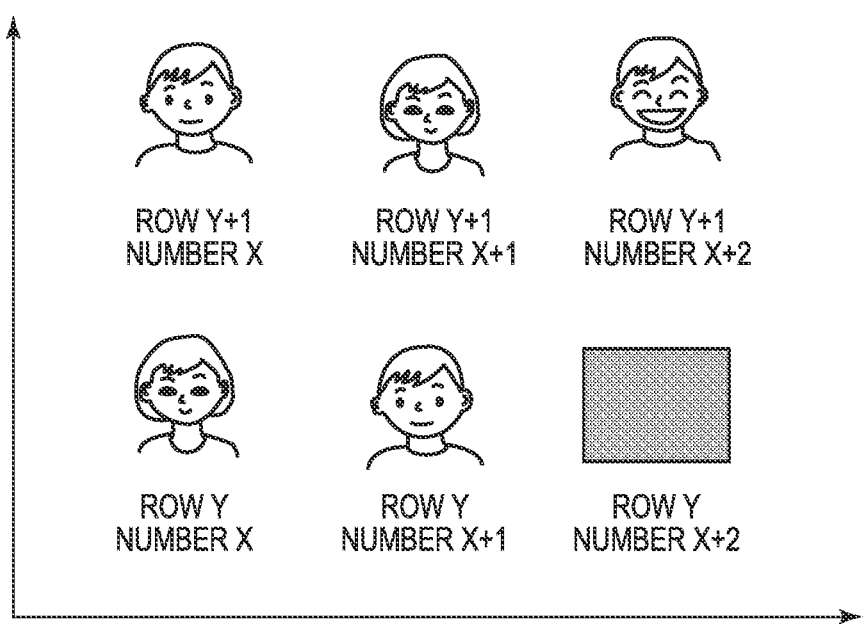
FIG. 12 is a diagram illustrating a relationship of seats in the seating arrangement according to the present embodiment.

FIG. 12 is a diagram illustrating a relationship of seats in the seating arrangement according to the present embodiment. Using the bottom-left seat position within the group as a reference, the horizontal seat position is expressed as "number" and the vertical seat position is expressed as "row", and the numeral of "number" is incremented toward the right side in the horizontal direction, and the number of "row" is incremented toward the upper side in the vertical direction.

FIG. 12 illustrates a specific example of the seating arrangement in the pattern (2) of FIG. 11B. Although there is no user of the group in the number X+2/row Y, it is required as data for when cropping the rectangle, so it is defined as an out-of-group seat in the data structures of FIGS. 13 and 14 described later.

The description returns to that of FIG. 10.

The CPU 01 acquires the cropping range and the out-of-group seat information (step S1002). Note that in step S1001, the cropping range may be calculated without calculating the cropping range in advance.

When there is out-of-group seat information in the group information acquired in step S1002 (YES in step S1003), the CPU 01 fills the cropping range of the seat position defined as an out-of-group seat with a single color of gray (step S1004). When there is no out-of-group seat information (NO in step S1003), the process of step S1004 is skipped.

In step S1004, if the entire region of the cropping position of the out-of-group seat is filled, it may partially overlap with the cropping position of the in-group seats adjacent to the upper and lower sides, and therefore, it is desirable to fill slightly inside of the cropping position. This is a process for preventing spectators outside the group from being captured, but the method of filling is not limited for the present invention, and if there is no particular problem of portrait rights or the like and the user's intention is that there is no problem even if a person outside the group is captured, the process of step S1004 may not need to be performed.

The CPU 01 determines the cropping position according to the method of calculating the cropping position from reference numerals 1303 to 1306 acquired in step S1002 (step S1005).

Figure 15A:
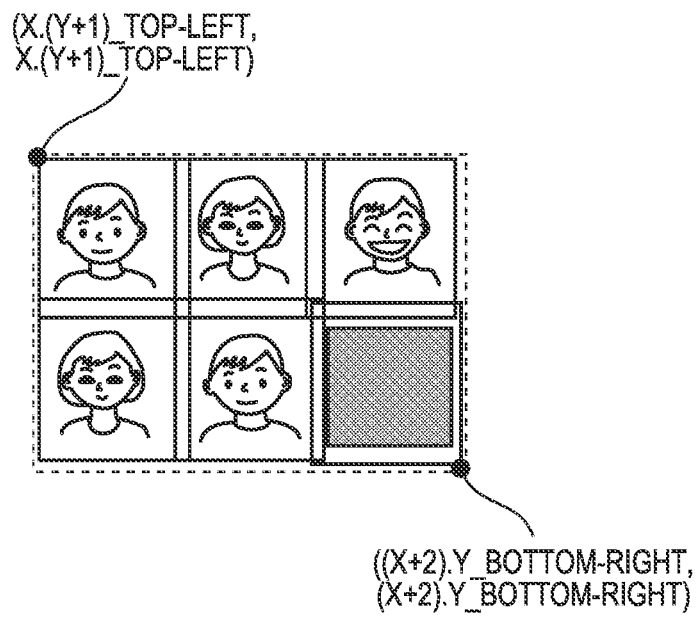
FIG. 15A is a diagram illustrating an example of calculation of a cropping position according to the present embodiment.
Figure 15B:
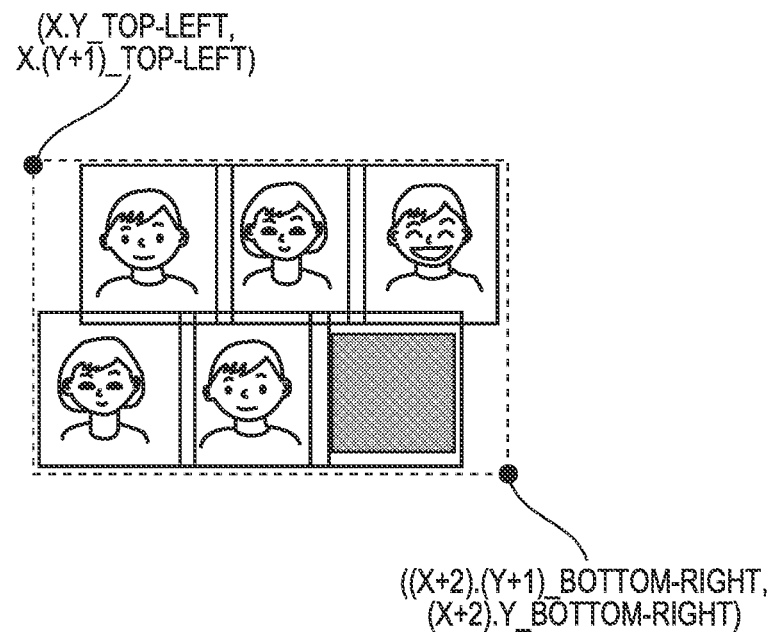
FIG. 15B is a diagram illustrating an example of calculation of a cropping position according to the present embodiment.

FIG. 15A and FIG. 15B are diagrams illustrating examples of calculation of a cropping position according to the present embodiment. FIG. 15A is an example of a calculation method for an image captured from approximately in front of the spectators as in FIG. 4A and FIG. 4B, and FIG. 15B is an example of a calculation method for an image in which the spectators were captured somewhat diagonally as in FIG. 5A and FIG. 5B. In FIG. 15A, the top-left vertex of the top-left seat and the bottom-right vertex of the bottom-right seat are simply used as vertices of the entire cropping position; however, in FIG. 15B, since the upper and lower rows are slightly askew, Top-Left Vertex
X-coordinate=X-coordinate of the top-left vertex of the bottom-left seat
Y-coordinate=Y-coordinate of the top-left vertex of the top-left seat
Bottom-Right Vertex
X-coordinate=X-coordinate of the bottom-right vertex of the top-right seat
Y-coordinate=Y-coordinate of the bottom-right vertex of the bottom-right seat
are defined, and the coordinate positions of the top-left vertex and the bottom-right vertex are determined using this calculation method.

The description returns to that of FIG. 10.

In accordance with the cropping position determined in step S1005, the CPU 01 generates a cropped image cut out at the cropping position in accordance with the corresponding number of people and the seating arrangement from the whole image captured by the camera and stores the cropped image together with the capturing date/seat number information in the storage 205 (step S1006).

In the above-described embodiment, the system may be operated as described below so that the spectators can acquire images more easily.

Set a browsing request for the distribution server to be reading of a ticket QR code (registered trademark).

Although configuration is such that the group information is acquired in advance, the group information may be acquired each time processing is performed. In this case, since the ticket purchase system also needs to always regenerate the group information and this is acquired from the cropping unit 202 every time, the processing of the entire system increases; however, this is effective, for example, in the case of baseball, whose percentage of the same-day ticket sales is large and a lot of group information is produced after the start of the game.

Next, a case where the spectator does not indicate an image purchase intention in advance but attempts to purchase an image after the game ends will be described with reference to FIGS. 16 and 17.

Figure 16:
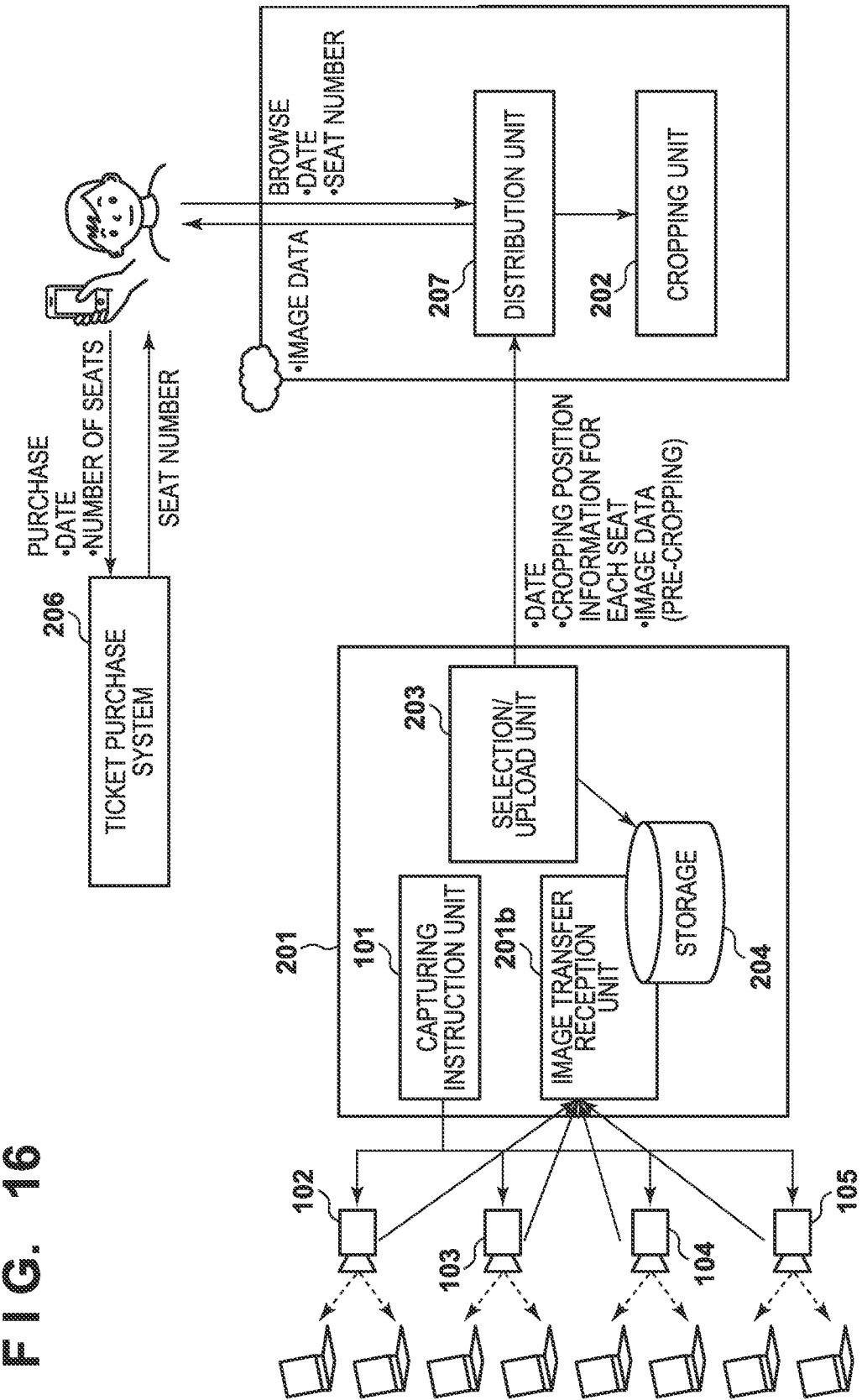
FIG. 16 is an overall configuration diagram of a system in a case where an image is provided after the end of a game according to the present embodiment.

FIG. 16 is another embodiment of an overall configuration diagram of a system in the image providing system according to the present embodiment. The image processing apparatus 201 includes the capturing instruction apparatus 101, the cameras 102 to 105, the image transfer reception unit 201b, the selection/upload unit 203, and the storage 204.

In FIG. 16, although each of the processing units 101, 201b, 203, and 204 is described as being in one image processing apparatus 201, it may be a physically different processing apparatus, and the configuration of the processing unit is not limited for the present invention. Similarly, the distribution unit 207 and the cropping unit 202 may be physically separate processing apparatuses.

Description will be omitted for the capturing processing apparatus 101, the cameras 102 to 105, the camera image transfer reception unit 201b, and the ticket purchase unit 206 because it is the same as that of FIG. 2.

The selection/upload unit 203 uploads the captured image data to the distribution unit 207 together with the date and time information of the event and the cropping position information for each seat triggered by the captured image data being stored in the storage 204.

Since the captured image data here is high-resolution data that has not been cropped, when the number of captured images increases due to interval capturing or the like or when the number of cameras increases, a large amount of data will be uploaded to the distribution unit 207, and when a group cropping is attempted later, a larger amount of data must be retained by the system.

Here, the cropping position information for each seat is uploaded from the image processing apparatus 201 to the distribution unit 207, but the distribution unit 207 and the cropping unit 202 may have the information. However, since the cropping position information is only position information with respect to the images captured by the cameras 102 to 105, it is necessary to perform an update every time the mounting position and the angle of view of the cameras 102 to 105 on the image processing apparatus 201 side are changed, and therefore it is necessary for the system of the image processing apparatus 201, the distribution unit 207, and the cropping unit 202 to deal with the cropping position information in a more cooperative manner.

The distribution unit 207 transmits the thumbnail position information and the seat number acquired from the selection/upload unit to the cropping unit 202 using the event date and the seat number inputted by the user as a key, instructs the cropping process, and presents the acquired cropped image to the user.

Regarding the user input, similarly to FIG. 2, the user may look at the ticket and manually input the ticket, a QR code (registered trademark) or the like may be printed on the ticket or the seat and read and recognized by a smart phone, or if the ticket information is unknown, face detection may be performed, and so the input method is not limited to the above methods.

The presentation to the user may be a smartphone application or may be in the form of a web application that is accessed using a browser, and the presentation method is not limited for the present invention.

The cropping unit 202, although the processing itself is similar to FIG. 2, will generate a cropped image each time the user wishes to make a purchase, and since the cropping time is included in the time until the user acquires the cropped image, it is impossible to quickly provide an image. Further, in order to perform image processing quickly, an environment in which image processing can be performed at higher speed is required.

Next, in FIG. 17, a case in which the image data is stored in the storage 204 will be described. In the processing of FIG. 17, unlike in FIG. 16, a large amount of image data is not transmitted to the distribution unit 207, but since the image processing apparatus 201 requests and then uploads the image captured by the target camera after receiving the image purchase trigger from the user, the time it takes is longer than the time in FIG. 16 by the length of time it takes to acquire the image, and so it takes more time for the user to acquire the cropped image data.

Figure 17:
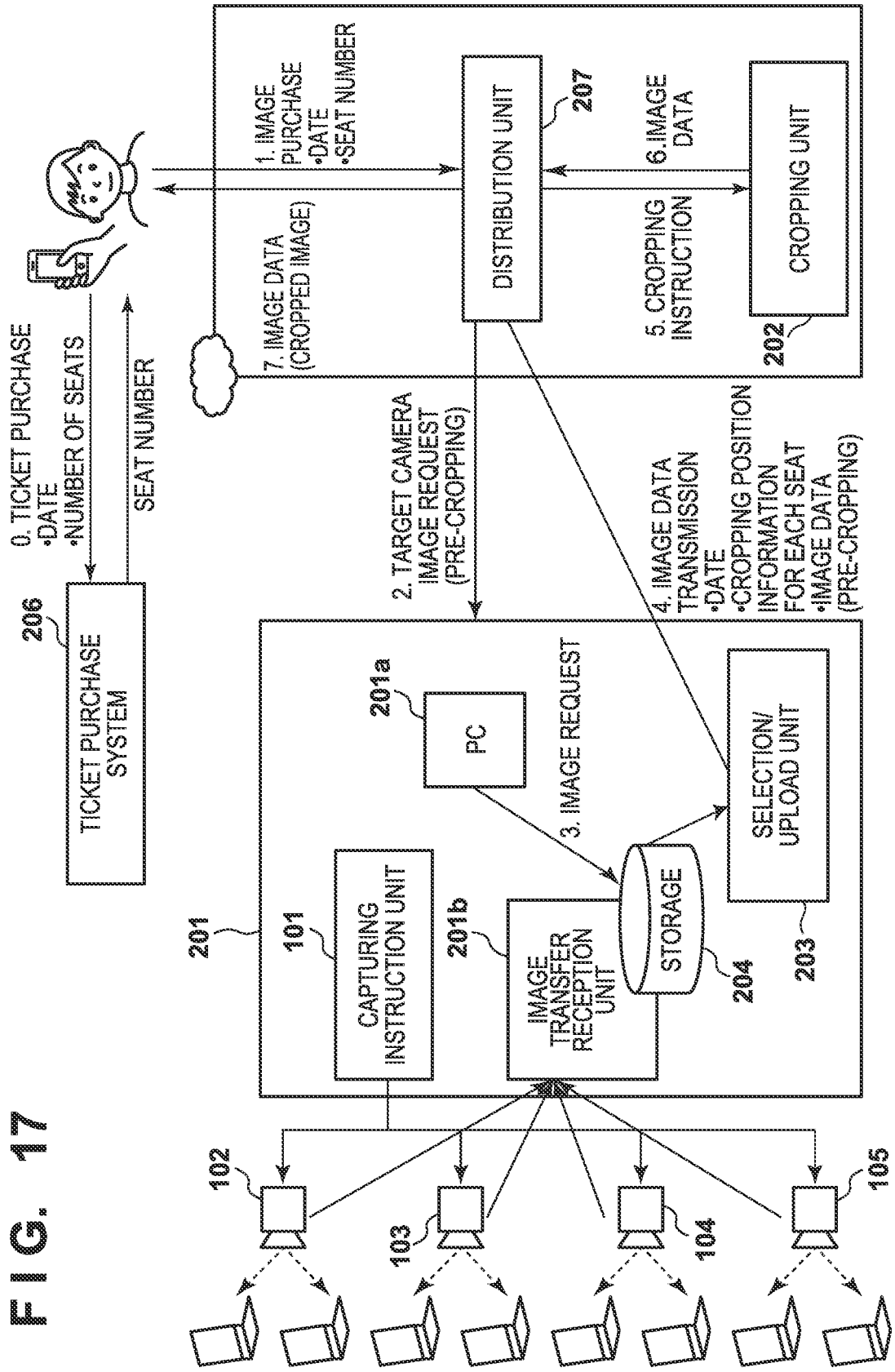
FIG. 17 is an overall configuration diagram of a system in a case where an image is provided after the end of a game according to the present embodiment.

FIG. 17 has the same configuration as FIG. 16.

In the present embodiment, assuming that the user has purchased a ticket, the process is then started from when an instruction to purchase an image is issued to the distribution unit 207 (step 1).

The distribution unit 207 requests the image processing apparatus 201 for the target camera image (step 2) and in the image processing apparatus 201, a request for the image is made to the storage 204 (step 3). Thereafter, the selection/upload unit 203 transmits the image data to the distribution unit 207 (step 4). At this time, since the image data includes date information (capturing date and time), cropping position information for each seat, and pre-cropped image data, the amount of data increases. When a cropping instruction is issued from the distribution unit 207 to the cropping unit 202 (step 5), the cropping unit 202 performs cropping, and the cropped image data is distributed to the distribution unit 207 (step 6). Thereafter, the cropped image is distributed from the distribution unit to the spectator who purchased the image (step 7).

As described above, in the method of FIG. 17, even if the spectator does not indicate an image purchase intention in advance, it is possible to provide the spectator with an image cropped for the cropping group. However, there are many exchanges in the system and in the apparatus, and there is a possibility that it may take more time to provide an image than for a spectator who intends to purchase an image in advance.

When an image is provided to a spectator, seat information is also linked and provided to the spectator, so that when the spectator uploads the image to a social network site (hereinafter referred to as an SNS), it is possible for a person who saw the image to recognize at which seat position a good image can be captured.

Furthermore, by performing image processing relating to brightness according to the seat position so as to provide an appropriate image for dark portions and bright portions, it is possible to provide a better image even if spectators across a wide range including a plurality of seats are included in the same angle of view. In the case where the brightness in the same angle of view changes more than a predetermined amount, it may be easier to obtain a RAW image, and then process the image later.

Figure 18:
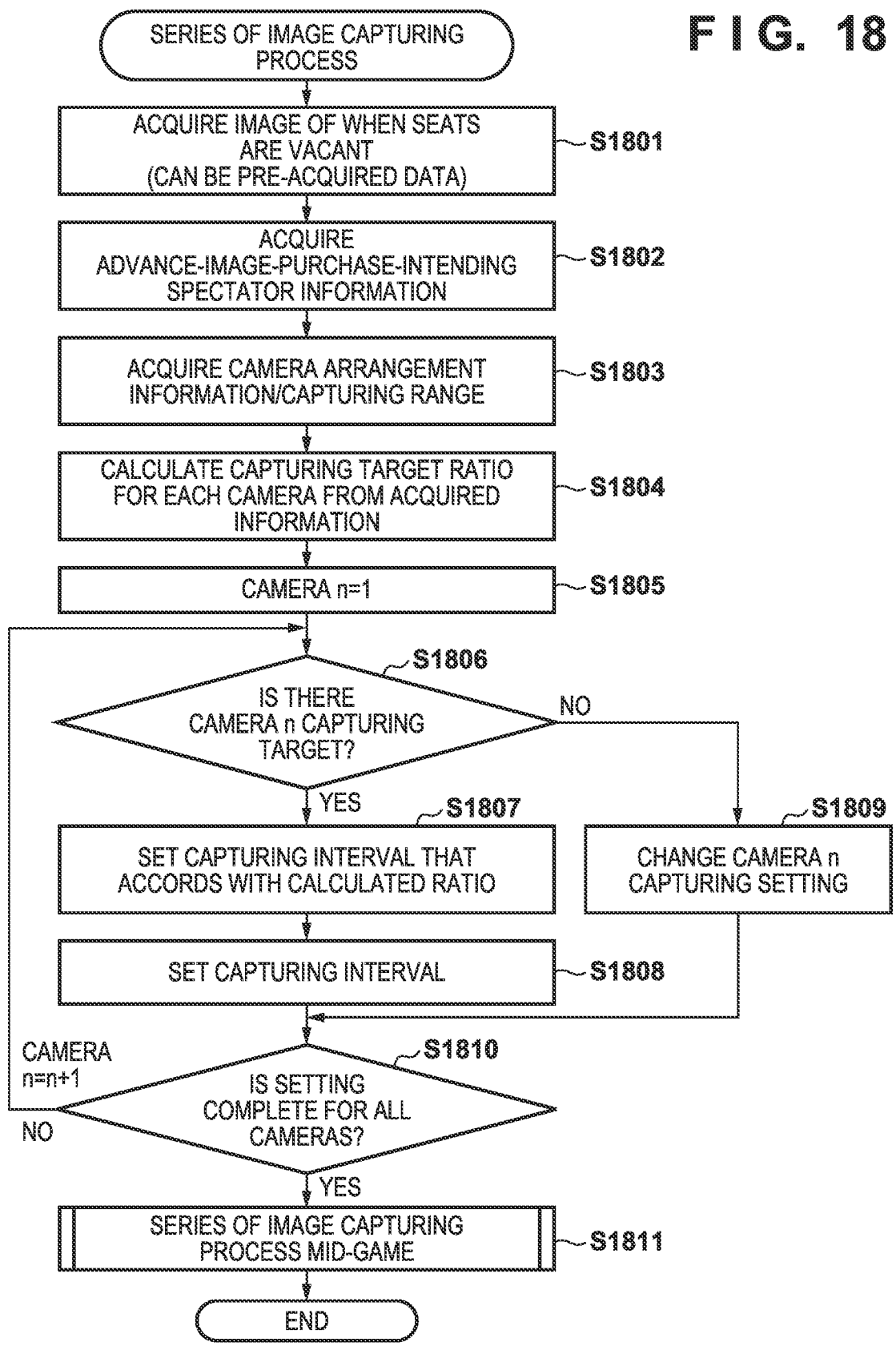
FIG. 18 is a flowchart illustrating an example of a series of image capturing process according to the present embodiment.

Next, a series of image capturing process in the present embodiment will be described with reference to FIG. 18. The series of image capturing process is a process for changing the capturing frequency in accordance with the vacancy state of the spectator stand. This process is realized by the CPU 01 deploying the program stored in the ROM 02 (non-volatile memory) in the RAM 03 (system memory) and then executing the program. Since a state in which it is before the start of the game and more spectator information is collected is preferred, this process is started at a predetermined time before the game, such as 10 minutes or 1 hour before the start of the game. Alternatively, the process may be started immediately after the start of the game.

In step S1801, the CPU 01 acquires images of when seats are vacant in the capturing range of each camera. Regarding the images of when seats are vacant in the capturing range, those captured in advance may be acquired, or capturing may be performed every game.

In step S1802, the CPU 01 obtains information about spectators who intend to purchase an image in advance. An image-purchase-intending spectator is a spectator who has indicated a cropped image purchase intention in the ticket purchase process illustrated in FIG. 7.

In step S1803, the CPU 01 acquires information on the arrangement of the cameras and acquires information on the seats in the capturing range of the cameras. The seat type is also acquired at this time.

In step S1804, the CPU 01 calculates a capturing target ratio of how many spectators who are capturing targets there are from the information acquired in step S1803 and the spectator information acquired in step S1802. The capturing target ratio is obtained by dividing the number of image-purchase-intending spectators by the number of seats. In step S1804, the capturing target ratios of the respective cameras are calculated.

In step S1805, the CPU 01 acquires the capturing target ratio of the camera n=1 calculated in step S1804.

In step S1806, the CPU 01 determines whether or not there is a camera n capturing target, that is, an image-purchase-intending spectator in the capturing range of the camera n. If it is determined that there is a camera n capturing target, the process proceeds to step S1807; otherwise, the process proceeds to step S1809.

In step S1807, the CPU 01 determines the capturing interval in accordance with the calculated capturing target ratio. For example, if the capturing target ratio for image-purchase-intending spectators is 50% or more, the CPU 01 sets the capturing interval to T=5 seconds, and if it is 30% or more, the CPU 01 sets the capturing interval to T=10 seconds. If the number of shots increases, the number of images stored in the storage 204 increases, and there is a possibility that the speed of providing the images to the spectators may decrease. Therefore, by determining the number of images to be stored in the storage 204, that is, the number of images to be captured, with respect to the number of images that may be provided to the spectators, it is possible to prevent the speed of providing images from decreasing.

In step S1808, the CPU 01 sets the capturing interval T so that the camera n performs capturing at the set capturing interval.

In step S1809, the CPU 01 changes the capturing setting of the camera n. When there is no capturing target, the camera n may be used as a camera for capturing a scene of a game, for example, instead of capturing a spectator, or may be used as a camera for capturing fireworks or a scoreboard. Alternatively, capturing need not be performed. This can reduce the number of images stored in the storage 204.

In step S1810, the CPU 01 determines whether setting of step S1808 or S1809 has been performed for all cameras. If it is determined that the capturing settings for all the cameras have been performed, the process proceeds to step S1811, and otherwise, the capturing target ratio of camera n=n+1 is obtained, and the process proceeds to step S1806.

In step S1811, the CPU 01 executes a series of image capturing process (during game). The series of image capturing process (during game) will be described with reference to FIG. 19.

Figure 19:
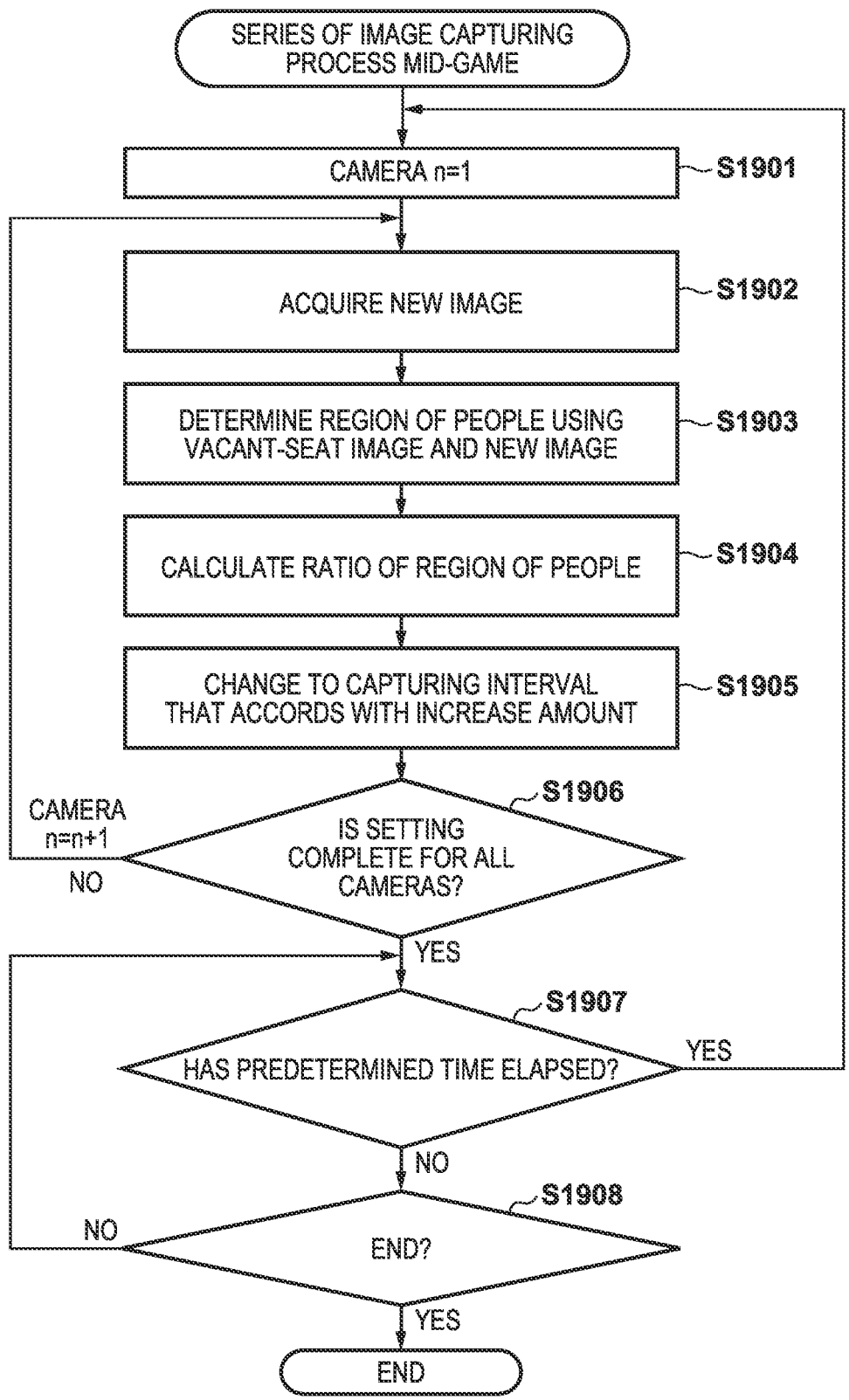
FIG. 19 is a flowchart illustrating an example of a series of image capturing process (during game) according to the present embodiment.

Next, a series of image capturing process (during game) will be described with reference to FIG. 19. The flowchart illustrated in FIG. 19 starts when the process proceeds to step S1811 in FIG. 18. The process illustrated in FIG. 19 may be performed after the capturing intervals for the respective cameras n have been set in step S1808 (step S1809) even if it is not during the game. FIG. 19 is a process for updating the capturing interval set in immediately prior FIG. 18. Before the game, the information at the time of ticket purchase is known, but after the game starts, it is known how many spectators are actually in the seats. This process is realized by the CPU 01 deploying the program stored in the ROM 02 (non-volatile memory) in the RAM 03 (system memory) and then executing the program.

In step S1901, the CPU 01 acquires camera arrangement information about the camera n=1, capturing range information, and image-purchase-intending spectator information.

In step S1902, the CPU 01 acquires the image of the camera n captured immediately previously.

In step S1903, the CPU 01 compares an image of when seats are vacant acquired in step S1801 when the seats are vacant with the image acquired in step S1902 and determines what regions spectators are seated in.

In step S1904, the CPU 01 calculates a ratio of the region of people.

In step S1905, the CPU 01 changes the capturing interval T in accordance with the increase in people. For example, in the ticket purchase information, 30% of the seats are scheduled to be filled, but if tickets were purchased after the start of the game or immediately before the start of the game and 60% of the seats are filled, the capturing interval T set in step S1808 is changed from 10 seconds to 7 seconds. It is highly likely that the spectator who purchased the ticket around the start of the game has not performed the process related to the image purchase intention explained in FIG. 7. Therefore, the capturing interval T set in step S1808 is changed in accordance with the rate of increase or decrease in people. In step S1905, the capturing interval T may be changed according to the ratio of the region of the spectator calculated in step S1904, or the process of FIG. 8 need not be performed for the non-designated seats in the first place, and the capturing interval T may be set based on the ratio calculated in step S1904 of FIG. 19.

In step S1906, the CPU 01 determines whether setting of step S1905 has been performed for all cameras. For when it is determined that the process of step S1905 has been performed for all cameras, the process proceeds to step S1907, and if not, the camera arrangement information, the capturing range information, and the image-purchase-intending spectator information related to the camera n=n+1 are acquired, and then the process proceeds to step S1902.

In step S1907, the CPU 01 determines whether a predetermined time has elapsed. The predetermined time is, for example, 20 minutes or 30 minutes, and is an interval at which the capturing interval T in step S1905 is updated. If it is determined that the predetermined time has elapsed, the process proceeds to step S1901; otherwise, the process proceeds to step S1908.

In step S1908, the CPU 01 determines whether or not to end the process of FIG. 19. If it is determined to end the process of FIG. 19, the process ends; otherwise, the process proceeds to step S1907. The process of FIG. 19 ends in response to the end of capturing.

As described above, according to the embodiment, since the capturing interval T is changed based on the vacant seat information, it is possible to provide an image without missing a capturing opportunity when there are many spectators while reducing the image data amount. Since the capturing opportunities differ depending on the respective groups and the spectators, as the number of spectators shot in one capturing increases, the capturing opportunities become more varied. Therefore, by determining the capturing interval T according to the number of spectators, the possibility that capturing can be performed without missing the capturing opportunity of each spectator when the number of spectators increases is improved. When the number of spectators decreases, the amount of data can be reduced.

Next, description will be given for each variation of series of image capturing process (during game) described in FIG. 19 with reference to FIG. 20 to FIG. 21C. Similar to the flowchart illustrated in FIG. 19, FIG. 20 and FIG. 21A to FIG. 21C respectively start when the process proceeds to step S1811 illustrated in FIG. 18. This process is realized by the CPU 01 deploying a program stored in the ROM 02 (non-volatile memory) in the RAM 03 (system memory) and then executing the program.

FIG. 20 is a description of a variation in which the capturing interval is changed based on face-detection information.

In step S2001, the CPU 01 detects the face of the spectator from the image captured by the camera n. In the face detection of step S2001, the face of the spectator who indicated an image purchase intention in advance is detected.

In step S2002, the CPU 01 counts the number of people whose face was detected.

In step S2003, the CPU 01 calculates a ratio of the number of spectators who indicated an image purchase intention in advance and the number of people whose face was detected counted in step S2002. As a result, it can be known how many, among the spectators in the capturing range of the camera n, are actually spectators who indicated an image purchase intention in advance.

In step S2004, the CPU 01 designates a particular subject indicating a subject, such as a baseball team color, flag, goods, etc. The particular subject may be designated by a spectator who has indicated a purchase intention or may be designated by the image providing side.

In step S2005, the CPU 01 detects a particular subject from images acquired in step S2001.

In step S2006, the CPU 01 changes the capturing interval T in accordance with the ratio of the number of people whose face was detected calculated in step S2003 or changes the capturing interval T in accordance with the number of particular subjects detected in step S2005. Whether to change the capturing interval T according to the number of people whose face was detected or to change the capturing interval T according to the number of particular subjects may be selected by a spectator who indicated a purchase intention or may be set on the image providing side. For example, if the number of people whose face was detected is 50%, the capturing interval T set in step S1808 of FIG. 18 may be set to twice the interval. In addition, for example, when there are many spectators wearing a baseball team color uniform, there is a high possibility that the spectators may be excited; therefore, by shortening the capturing interval T, it is possible to reduce the possibility of missing the capturing opportunity.

In step S2007, the CPU 01 changes the coordinates to be focused and the zoom amount based on the result of face detection in step S2001. As a result, a more focused image can be provided to the image-purchase-intending spectator based on the position of the detected face.

As described above, according to the embodiment, the capturing interval T is changed in accordance with the detected face, and so the number of images stored in the storage 204 can be reduced. Note that the processing of FIG. 20 is performed for each camera.

Figure 21B:
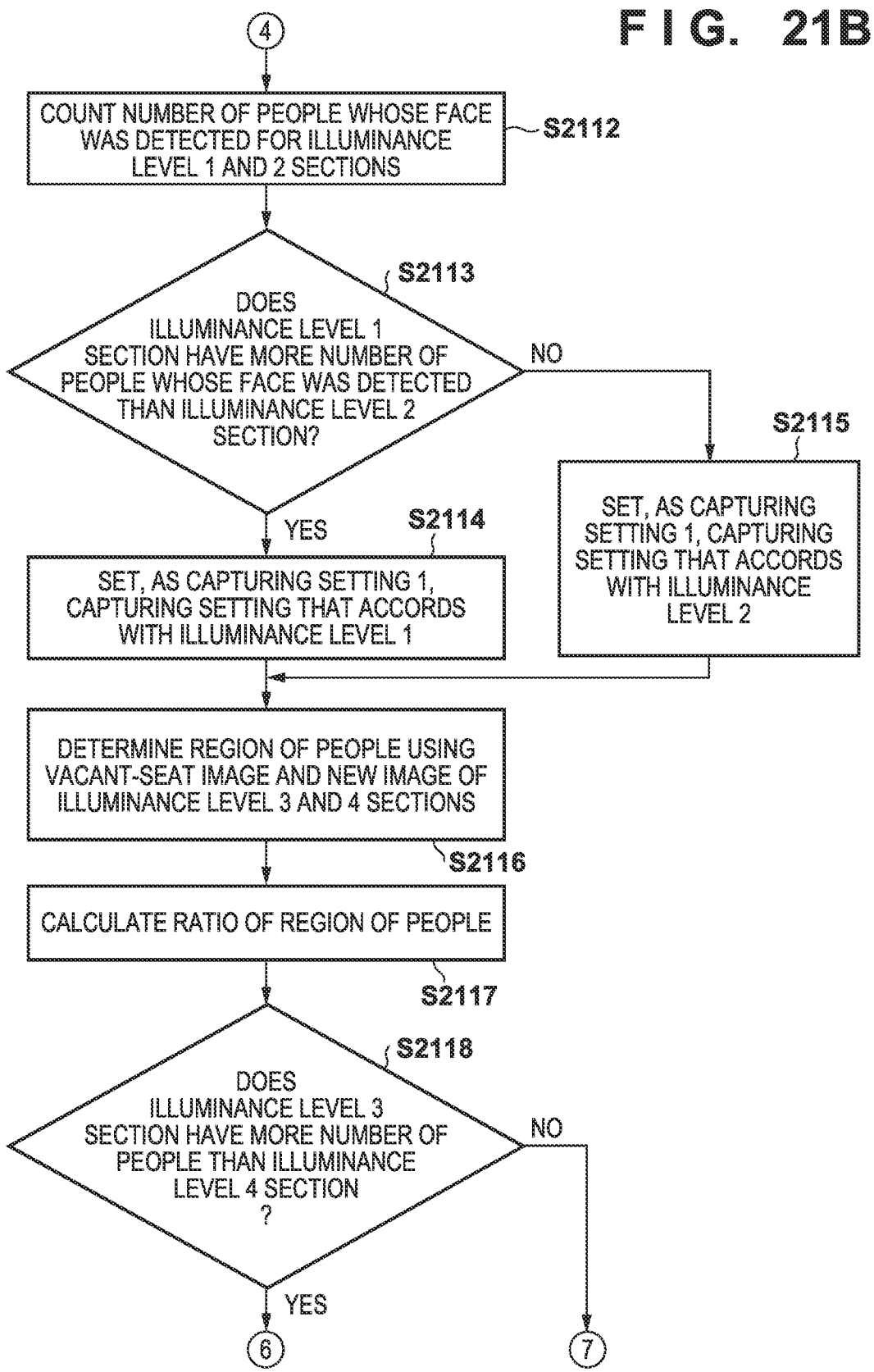
FIG. 21B is a flowchart illustrating another example of a series of image capturing process (during game) according to the present embodiment.
Figure 21C:
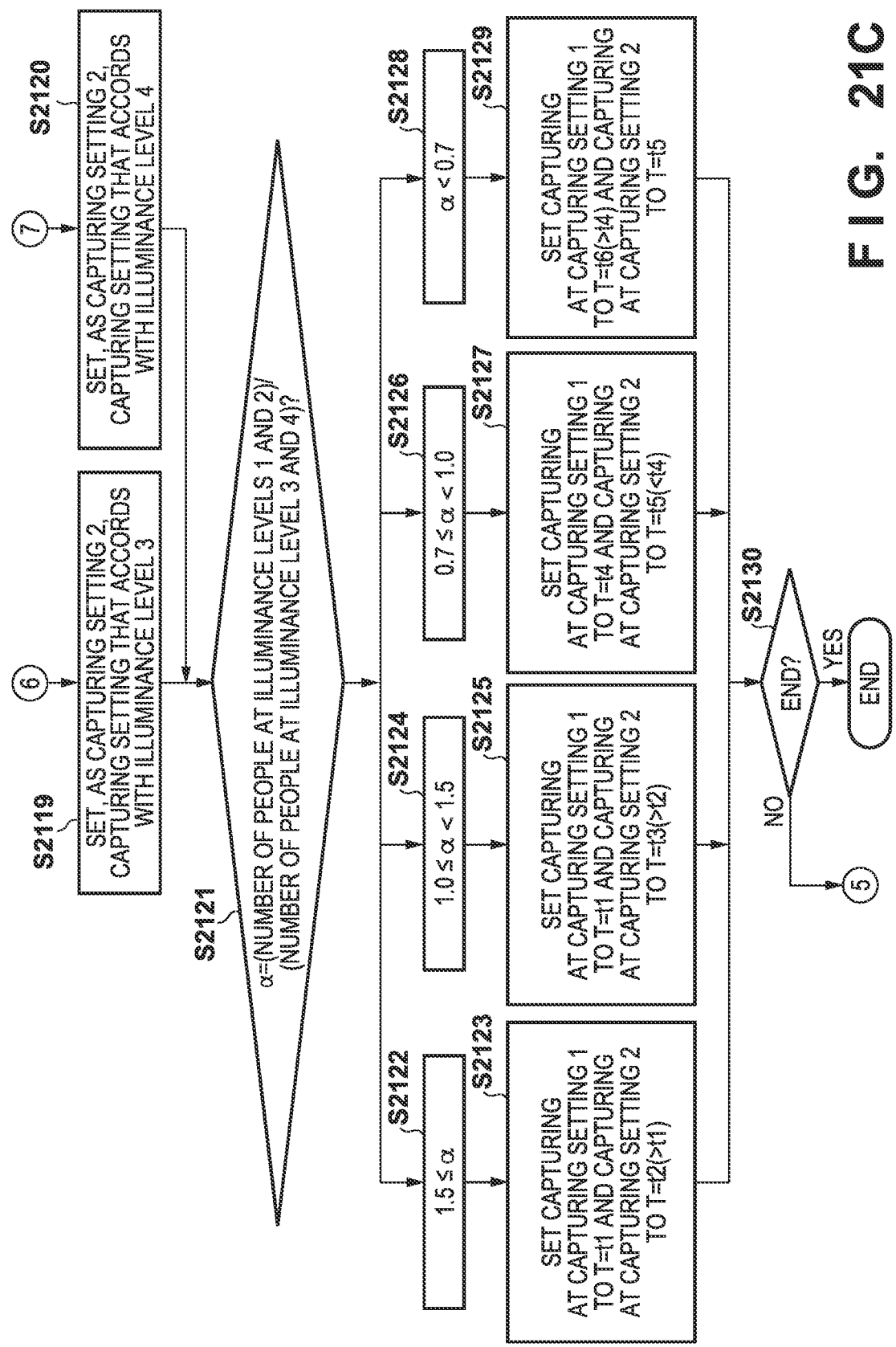
FIG. 21C is a flowchart illustrating another example of a series of image capturing process (during game) according to the present embodiment.

Next, FIG. 21A to FIG. 21C change the capturing conditions based on the ratio of vacant seats in the seats, enabling capturing to be performed under the capturing conditions that are suitable for more spectators. In outdoor sports such as baseball and soccer, the brightness of seats differs greatly depending on the amount of incoming sunlight and the position of the roof. At this time, if capturing is performed with exposure and the like, for example, that accord with a bright position, there is a possibility that the capturing may be unsuitable for a spectator in a dark region. The process for setting the ISO speed related to exposure, aperture value, and shutter speed to be suitable for more spectators in such cases is the process of FIG. 21A to FIG. 21C.

In step S2101, the CPU 01 acquires illuminance information of predetermined N sections from the acquired image of the camera n. It is assumed that N sections are sections consisting of seats, such as four or six adjacent seats, and include the entire region of the capturing range of the camera n. The acquired image of the camera n is captured at the timing of step S2101 but may be captured before step S2101.

In step S2102, the CPU 01 sets determination section n=1. The determination section indicates a section for which a determination is made to classify the section into one of illuminance levels 1 to 4 based on the illuminance information obtained in step S2102, where illuminance gradually becomes darker in the order of 1, 2, 3, and 4. The illuminance levels classify predetermined illuminances that are possible at a seat into levels. There need not be four illuminance levels as described in this embodiment and there may be two or three if the illuminance does not change greatly. In addition, if the capturing setting related to exposure does not change even when the illuminance changes, the illuminance level may be given a wider range as one illuminance level.

In step S2103, the CPU 01 determines whether or not the determination section n is an illuminance level 1 section based on the illuminance information of the determination section n. If it is determined that the section is illuminance level 1, the process proceeds to step S2104; otherwise, the process proceeds to step S2105.

In step S2104, the CPU 01 registers the determination section n in the illuminance level 1 list.

In step S2105, the CPU 01 determines whether or not the determination section n is an illuminance level 2 section based on the illuminance information of the determination section n. If it is determined that the section is illuminance level 2, the process proceeds to step S2106; otherwise, the process proceeds to step S2107.

In step S2106, the CPU 01 registers the determination section n in the illuminance level 2 list.

In step S2107, the CPU 01 determines whether or not the determination section n is an illuminance level 3 section based on the illuminance information of the determination section n. If it is determined that the section is illuminance level 3, the process proceeds to step S2108; otherwise, the process proceeds to step S2109.

In step S2108, the CPU 01 registers the determination section n in the illuminance level 3 list.

In step S2109, the CPU 01 registers the determination section n in the illuminance level 4 list.

In step S2110, the CPU 01 determines whether the determination for all of the determination section is completed. If it is determined YES in step S2110, the process proceeds to step S2112; otherwise, the process proceeds to step S2111.

In step S2111, the CPU 01 sets the determination section n=n+1 and proceeds to step S2103.

Transitioning to FIG. 21B, in step S2112, the CPU 01 counts the number of people whose face was detected in the illuminance level 1 and 2 sections. That is, the number of faces of the spectator in the illuminance level 1 area and the number of faces of the spectator in the of illuminance level 2 area are counted respectively.

In step S2113, the CPU 01 determines whether or not the number of people whose face was detected is larger in the illuminance level 1 section than in the illuminance level 2 section. If it is determined that the number of people whose face was detected is larger in the illuminance level 1 section than in the illuminance level 2 section, the process proceeds to step S2114, and if not, the process proceeds to step S2115.

In step S2114, the CPU 01 sets, as the capturing setting 1, the capturing setting related to exposure that accords with the illuminance 1.

In step S2115, the CPU 01 sets, as the capturing setting 1, the capturing setting related to exposure that accords with the illuminance 2.

In step S2116, the CPU 01 compares the vacant-seat image of the illuminance level 3 and 4 sections with the acquired image of the camera n and then determines the region in which the spectators are sitting. The acquired image of the camera n is captured by the camera n in step S2116 but may be captured before step S2116.

In step S2117, the CPU 01 calculates the ratio of the region where there are people in the illuminance level 3 and 4 sections. Since the illuminance is low at illuminance levels 3 and 4, the accuracy of human face detection may be lower than at illuminance levels 1 and 2. Therefore, instead of detecting the face, how many people are sitting is calculated by comparing images. On the other hand, in the case of illuminance levels 1 and 2, face detection is used to count the number of people more accurately.

In step S2118, the CPU 01 determines whether or not the number of people is larger in the illuminance level 3 section than in the illuminance level 4 section. If it is determined that the number of people is larger in the illuminance level 3 section than in the illuminance level 4 section, the process proceeds to step S2119, and if not, the process proceeds to step S2120.

Transitioning to FIG. 21C, in step S2119, the CPU 01 sets, as the capturing setting 2, the capturing setting related to exposure that accords with the illuminance 3.

In step S2120, the CPU 01 sets, as the capturing setting 2, the capturing setting related to exposure that accords with the illuminance 4.

Next, in steps S2121 to S2129, the process of setting the capturing interval T according to the number of people at the respective illuminance levels is performed.

In step S2121, the CPU 01 calculates the ratio of number of people by illuminance α=(number of people in illuminance levels 1 and 2)/(number of people in illuminance levels 3 and 4) acquired in step S2112, step S2116. When it is determined that the value of α is 1.5 or more, that is, there is 1.5 times or more people in bright regions than in dark regions in the capturing range of the camera n, the process proceeds to step S2122. If 1.0≤α≤1.5, the process proceeds to step S2124; if 0.7≤α<1.0, the process proceeds to step S2126; and if α<0.7, the process proceeds to step S2128.

In step S2123, the CPU 01 sets the capturing at the capturing setting 1 to T=t1 and sets the capturing at the capturing setting 2 to T=t2 (>t1). For example, t1 is 5 seconds and t2 is 10 seconds.

In step S2125, the CPU 01 sets the capturing at the capturing setting 1 to T=t1 and sets the capturing at the capturing setting 2 to T=t3 (>t2). For example, t1 is 5 seconds and t3 is 15 seconds.

In step S2127, the CPU 01 sets the capturing at the capturing setting 1 to T=t4 and sets the capturing at the capturing setting 2 to T=t5 (<t4). For example, t4 is 10 seconds and t5 is 5 seconds.

In step S2129, the CPU 01 sets the capturing at the capturing setting 1 to T=t6(>t4) and sets the capturing at the capturing setting 2 to T=t5. For example, t6 is 15 seconds and t5 is 5 seconds.

Thus, when there are more people in a bright region, capturing with the exposure setting that accords with the illumination of the bright region is performed more frequently than capturing with the exposure setting that accords with the illumination of the dark region. Also, when there are more people in a dark region, capturing with the exposure setting that accords with the illumination of the dark region is performed more frequently than capturing with the exposure setting that accords with the illumination of the bright region.

In step S2130, the CPU 01 determines whether or not to end the process of FIG. 21A to FIG. 21C. When it is determined to end the process of FIG. 21A to FIG. 21C, the process of FIG. 21A to FIG. 21C ends, and otherwise, the process proceeds to step S2101.

As described above, according to the described embodiment, the frequency of capturing at the capturing setting that accords with the illuminance level is performed according to the number of spectators, and so it is possible to increase the images in which the spectator is captured better, that is, captured in an appropriate capturing condition. In addition, in a region where the spectator is small, the capturing interval T is increased and capturing frequency is decreased, so the image data amount can be reduced.

Next, a method of providing an image of a spectator displayed on a monitor of the venue will be described. Sports game venues and amusement facilities such as aquariums often have large screens. In addition, there are events in which a spectator is displayed on the screen. At this time, in order to provide an image displayed on the screen to the spectator displayed on the screen, it is necessary to specify the spectator. However, when face detection is used, it takes time at a sports game or the like in which there are several ten thousand of spectators.

In this embodiment, a method of providing an image to a spectator displayed on a screen will be described with reference to FIGS. 22 to 24.

FIG. 22 is a flowchart relating to a pre-registration process for a screen. This process can be initiated in response to the start of ticket sales prior to the start of the game. This process is realized by the CPU 01 deploying the program stored in the ROM 02 (non-volatile memory) in the RAM 03 (system memory) and then executing the program.

In step S2201, the CPU 01 determines whether or not the spectator has a cropped image purchase intention. If it is determined that there is a cropped image purchase intention, the process proceeds to step S2202; otherwise, step S2202 is skipped and the process proceeds to step S2203.

In step S2202, the CPU 01 registers the seat number in an image buyer list.

In step S2203, the CPU 01 determines whether or not screen image acquisition pre-registration has been performed. At the time of ticket purchase, it is possible to select whether or not the spectator would want the image if the spectator is displayed on the screen. If pre-registration is selected, the process proceeds to step S2204; otherwise, the pre-registration process ends.

In step S2204, the CPU 01 registers the seat number in a list for a screen. Note that the image buyer list and the screen list are lists created for each game.

In step S2205, the CPU 01 determines whether face registration has been performed. If it is selected to perform pre-registration in step S2203, a guide to the effect that if the spectator captures their face, it is possible to acquire the image of when they appeared on the screen with a higher chance is displayed. If the spectator selects to perform face registration, the face of the registrant is captured in step S2206. If it is selected to not perform face registration, the process proceeds to step S2208. Regarding capturing, when an application terminal is a smartphone, capturing may be performed with a built-in camera on the spot, or an image may be selected those captured in advance.

In step S2207, the CPU 01 associates the seat number and the face data.

In step S2208, the CPU 01 issues a temporary ID to the spectator and registers the information associated in step S2207 in the screen list. The temporary ID is individual information distributed to a spectator who has registered in advance in each game and is used to obtain an image.

As described above, according to the described embodiment, by registering their face in advance, the spectator can easily acquire an image of themselves displayed on the screen.

Next, a list of spectators to be created on the day of the game will be described with reference to FIG. 23.

Figure 23:
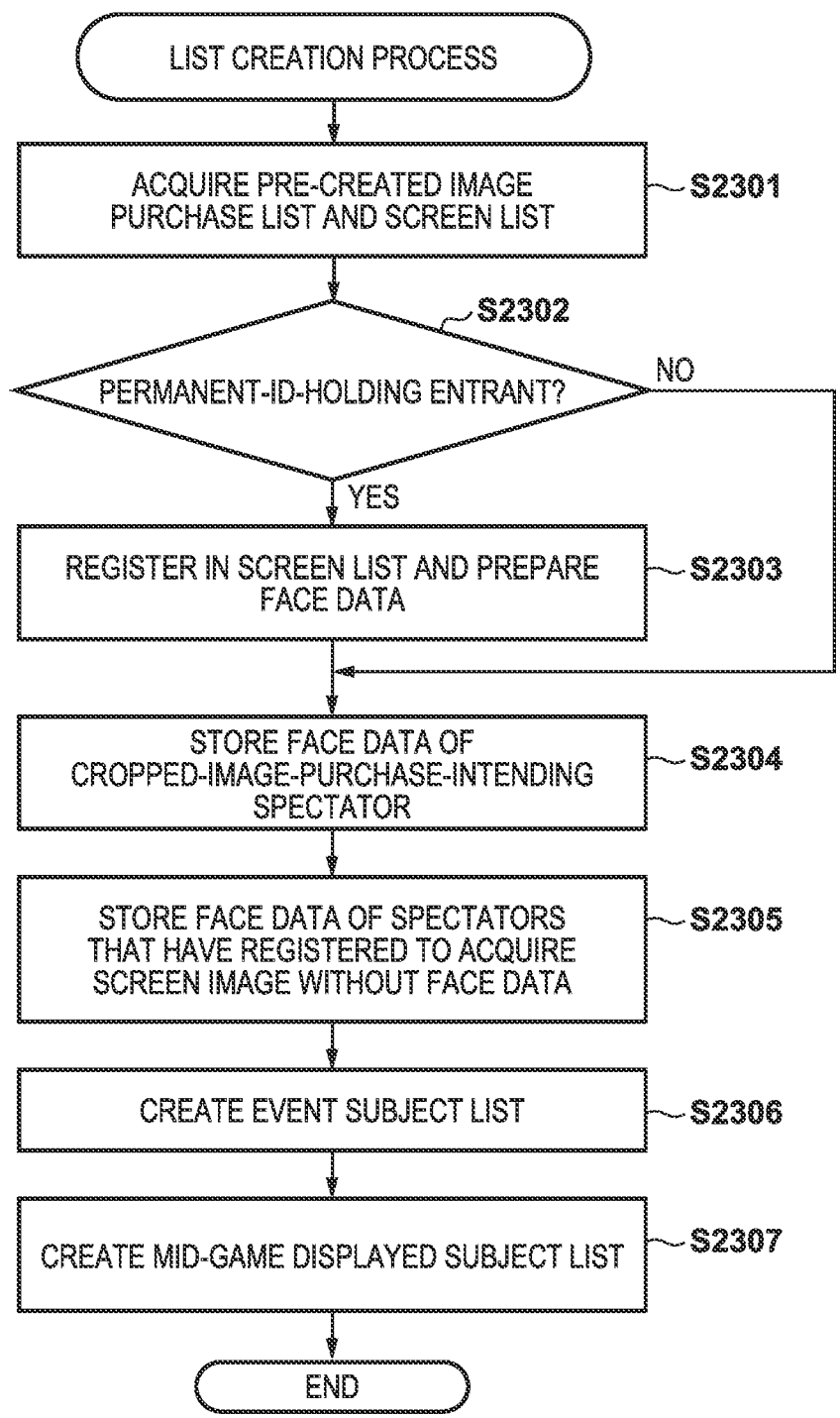
FIG. 23 is a flowchart related to a screen registrant list creation process according to the present embodiment.

FIG. 23 is a flowchart relating to a screen registrant list creation process. This process is performed in a limited time such as 10 minutes or 20 minutes after the start of the game. This process is realized by the CPU 01 deploying the program stored in the ROM 02 (non-volatile memory) in the RAM 03 (system memory) and then executing the program.

In step S2301, the CPU 01 acquires a pre-created image purchase list and the screen list.

In step S2302, the CPU 01 determines whether a spectator who holds a permanent ID has entered. The permanent ID is for distinguishing an ID from the temporary ID, and is individual information distributed to spectators who are in a fan club or are registered in a team's application. The spectator who holds a permanent ID is a frequent spectator and has visited many times, so it is assumed that there already is face data.

In step S2303, the CPU 01 registers, in the screen list, the permanent-ID-holding spectator who has entered and prepares the face data.

In step S2304, the CPU 01 stores face data of the cropped image-purchase-intending spectator. Regarding the cropped image-purchase-intending spectator, face data is stored from the cropped image.

In step S2305, the CPU 01 stores face data of a spectator for whom there is no face data among the spectators that have registered to acquire a screen image. Cropping is performed so as to include the spectator at the position registered in step S2204, and then the face data is stored.

In step S2306, the CPU 01 creates an event subject list from the image purchase list and the screen list. This is a list used when a video camera captures a scene of a cheering spectator during a game and that is displayed on a screen. Since not all the seats are displayed even if capturing is performed by a plurality of video cameras, seats that are, in the first place, not captured in the video camera during an event are not included in the event subject list. For example, seats on floors that are not captured from the position of the video camera for the event or seats in front of the video camera for the event are not included in the event subject list.

In step S2307, the CPU 01 creates a mid-game display list from the image purchase list and the screen list. There are cases where a state in which the spectator is captured with the player in the game may be displayed on the screen. For example, a spectator in a seat in the area 1 is likely to also be captured when a player is captured. Therefore, targeting the seats that may be the capturing range of the video camera for capturing the players during the game, an in-game display list is created from the image purchase list and the screen list.

As described above, according to the described embodiment, since the list is created focusing on the spectators who may want the image where they were displayed on the screen, the processing load at the time of face detection can be reduced, and the image can be quickly provided to the spectators. In addition, by creating different lists depending on the triggers for when they are displayed on the screen, the processing load can be further reduced.

Next, image providing process will be described with reference to FIG. 24.

FIG. 24 is a flowchart relating to a process for providing a screen image. This process is started in response to the start of display of the spectators on the screen. This process is realized by the CPU 01 deploying the program stored in the ROM 02 (non-volatile memory) in the RAM 03 (system memory) and then executing the program.

In step S2401, the CPU 01 determines whether it is mid-event. If it is determined to be mid-event, the process proceeds to step S2402; otherwise, the process proceeds to step S2403.

In step S2402, the CPU 01 prepares the event subject list.

In step S2403, the CPU 01 prepares the in-game displayed subject list.

In step S2404, the CPU 01 acquires the screen image in which the spectator is captured. This image may be acquired from a video camera that captured the spectator, or a camera may be provided for observing the screen.

In step S2405, the CPU 01 detects the face of the main subject in the image acquired in step S2404.

In step S2406, the CPU 01 matches the face detected in step S2405 against the face data of the ID holders in the list prepared in step S2402 or S2403 and determines whether or not they match. If it is determined that the ID holder and the face data match, the process proceeds to step S2407; otherwise, the process proceeds to step S2408.

In step S2407, the CPU 01 stores, in the storage 204, the image displayed on the screen along with the seat number and date of the spectator whose face data is determined have matched in step S2406 and immediately distributes the image to the spectator. It should be noted that a moving image may be distributed here instead of a still image. In step S2408, the CPU 01 determines whether or not the face detected in step S2405 matches the face data of the cropped-image-purchase-intending spectator in the list prepared in step S2402 or S2403. If it is determined that the face data of the cropped-image-purchase-intending spectator and the detected face match, the process proceeds to step S2409, and if not, the process proceeds to step S2410.

In step S2409, the CPU 01 stores, in the storage 204, the image cropped around the time of capturing of the spectator whose face data has been determined to have matched in step S2408 with the image displayed on the screen, and then immediately distribute the cropped image to the spectator.

In step S2410, the CPU 01 determines whether or not the face detected in step S2405 matches with the face data of the person who wishes to acquire the screen image in the list prepared in step S2402 or S2403. If it is determined that the person who wishes to acquire the screen image and the face data matches, the process proceeds to step S2411, and if not, the process of FIG. 24 ends. Also, when it is determined that an event in which a spectator is displayed on the screen has occurred, the process proceeds to step S2401 again, and the processing is performed.

In step S2411, the CPU 01 stores the image with the seat number and date in the storage 204 and distributes it to the spectator. The distribution method may be a different distribution method to the method of distributing the cropped image to a person who wishes to purchase the cropped image or it may be the same method.

Further, the image displayed on the screen distributed to the spectator may be an image from the video camera or may be a shot of the screen itself.

According to the embodiment described above, when an image is provided to a spectator after detecting the face of a spectator displayed on the screen, the image can be provided quickly and reliably.

Since matching is determined against the detected face by creating a list of spectators who are likely to want an image and narrowing down to a list of spectators in ranges which have the possibility of being displayed for each event, processing can be performed more quickly.

One advantage of the present invention is that images can be provided to more spectators.

One advantage of the present invention is that images can be quickly provided to more spectators.

One advantage of the present invention is that images can be provided to spectators displayed on a screen.

<Other Embodiments>

In the embodiment described above, the present invention has been described as an image providing system, but it may be configured as an image providing apparatus.

Note that the image processing apparatus 201 of FIG. 2 need not be a single apparatus and may be divided into a plurality of apparatuses.

Although in FIG. 7, it has been described that the image purchase intention is inputted in step S702 immediately after ticket purchase in step S701, but ticket information such as a ticket code and a number may be read prior to the start of the game or during the game when accepting the image purchase intention of step S702. At this time, the group information generated in step S705 can be updated once the capturing is started, such as after the game is started. As a result, even when the number of people in the group is changed on the day or during the game, by updating the group information, the cropping can be performed including all the members of the group. In addition, configuration may be taken so as to enable a capturing reservation before purchasing a ticket. In this case, if the ticket information is read when the user purchases the ticket and decides the seat, the capturing is performed based on the read seat.

The seating arrangement patterns for the groups illustrated in FIGS. 11A to 11C need not be determined by the CPU 01 and may be determined on the user application side.

In step S1905 of FIG. 19, changing the capturing interval in accordance with an increase in the number of people has been described; however, the data relating to the number of game spectators may be held in advance, and the capturing interval may be controlled based on the data. At this time, data of the number of spectators according to the area may be held, and the capturing interval may be changed according to the area.

When providing an image in step S2411 of FIG. 24, the image may be provided in a set with an image shot around a time such as that provided in step S967. In addition, in step S2411, the image may be provided such that the user can know the position of the camera that captured the spectator displayed on the screen.

The present invention may also be realized in a process in which a program for realizing one or more of the above-described functions of each embodiment is supplied to a system or device via a network or storage medium, and one or more processors in a computer of the system or device reads and executes the program. It can also be realized by a circuit (e.g., ASIC) that realizes one or more functions.

Each of the embodiments described above is merely illustrative in the implementation of the present invention, and the technical scope of the present invention should not be construed as limited by these. In other words, the present invention may be embodied in various forms without departing from the technical idea thereof or the main characteristics thereof.

Note that the above-described various controls described as being performed by the image processing apparatus 201 may be performed by one piece of hardware or a plurality of pieces of hardware (e.g., a plurality of processors and circuits) sharing the processing to control the entire apparatus.

Further, although the present invention has been described in detail based on preferred embodiments thereof, the present invention is not limited to these specific embodiments, and various forms within the scope not departing from the gist of the present invention are also included in the present invention. Further, each of the above-described embodiments is merely one embodiment of the present invention, and it is also possible to appropriately combine each of the embodiments.

In the embodiment described above, a case where the present invention is applied to the image processing apparatus 201 has been described as an example, but the present invention is not limited to this example and can be applied to any electronic device or system including a plurality of electronic devices capable of controlling an image. That is, the present invention can be applied to a personal computer, a PDA, a mobile phone terminal, a portable image viewer, a printer device including a display, a digital photo frame, a music player, a game machine, an electronic book reader, and the like. In addition, it is needless to say that it is also applicable to perform control in combination with AI (artificial intelligence).

The present invention is also realized by executing the following processing. That is, the processing in which software (program) for realizing the functions of the above-described embodiments is supplied to a system or apparatus through a network or various storage media, and a computer (or a CPU or MPU) of the system or apparatus reads and executes the program code. In this case, the program and the storage medium storing the program constitute the present invention.

The present invention is not limited to the above embodiments and various changes and modifications can be made within the spirit and scope of the present invention. Therefore, to apprise the public of the scope of the present invention, the following claims are made.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image providing system comprising:
one or more processors that execute a program stored in a memory and thereby function as:
an acquisition unit that acquires ticket information including position information about a one or more seat positions for each user group from an external ticket purchase mechanism; and
a control unit that controls the image providing system to:
determine a cropping range of an image that is to be captured by an image capturing unit for each user group so that the cropping range includes the one or more seat positions for that user group, based on the ticket information, before the image capturing unit starts a series of image capturing in which the image capturing unit captures a plurality of images,
after the series of image capturing is started, continuously apply cropping that cuts out a part of a captured image based on the cropping range determined for each user group, and
upload each cropped image to a server that is accessible to users who have purchased tickets through the ticket purchase mechanism.

2. The image providing system according to claim 1, wherein, during the series of image capturing, if the ticket information is updated, control unit controls the image providing system to update the cropping range based on the updated ticket information.

3. The image providing system according to claim 1, wherein the series of image capturing is started regardless of a timing at which the acquisition unit acquires the ticket position information.

4. The image providing system according to claim 1, wherein
the image providing system can receive images from a plurality of cameras placed in different positions, and
the control unit controls the image providing system to apply cropping to an image from a camera, among the plurality of cameras, that captures an image capturing range in which the one or more seat positions of the users of a user group is/are included, wherein the cropping cuts out a part of the captured image based on the cropping range.

5. The image providing system according to claim 1, wherein
each of the users who have purchased tickets through the ticket purchase mechanism is allowed to obtain the cropped image from the server by inputting information about a date and time of an event for which the series of image capturing was performed or inputting the seat position.

6. A method for controlling an image providing system, the method comprising:
acquiring ticket information including position information about a one or more seat positions for each user group from an external ticket purchase mechanism; or
determining a cropping range of an image that is to be captured by an image capturing unit for each user group so that the cropping range includes the one or more seat positions for that user group, based on the ticket information, before the image capturing unit starts a series of image capturing in which the image capturing unit captures a plurality of images;
after the series of image capturing is started, continuously applying cropping that cuts out a part of a captured image based on the cropping range determined for each user group: and
uploading each cropped image to a server that is accessible to users who have purchased tickets through the ticket purchase mechanism.

7. An image providing system comprising:
one or more processors that execute a program stored in a memory and thereby function as
an acquisition unit that acquires information about a position to be a capturing target among a plurality of seats;
an instruction unit that instructs an instruction to an image capture apparatus about a capturing interval of image capturing for capturing images of which field of view includes the plurality of seats; and
a control unit that controls the image providing system to change the capturing interval to be instructed to the image capture apparatus based on the information acquired by the acquisition unit.

8. The image providing system according to claim 7, wherein the control unit controls the image providing system so that the image providing system changes the capturing interval such that the higher the ratio of the capturing target to the plurality of seats, the shorter the capturing interval, wherein the ratio is calculated using the information acquired by the acquisition unit.

9. The image providing system according to claim 7, wherein the control unit controls the image providing system to provide cropped images that are obtained by applying cropping by which a partial area of the field of view that is based on the information acquired by the acquisition unit is extracted.

10. The image providing system according to claim 7, wherein the control unit controls the image providing system to change a setting value for capturing of the image capture apparatus using the information acquired by the acquisition unit.

11. A method for controlling the image providing system, the method comprising:
acquiring information about a position to be a capturing target among a plurality of seats;
instructing an instruction to an image capture apparatus about a capturing interval of image capturing for capturing image of which field of view includes the plurality of seats; and
controlling the image providing system to change the capturing interval to be instructed to the image capture apparatus based on the information acquired by the acquiring.

* * * * *